US011050057B2

(12) United States Patent
Kaga et al.

(10) Patent No.: US 11,050,057 B2
(45) Date of Patent: Jun. 29, 2021

(54) ELECTRODE ACTIVE MATERIAL FOR SECONDARY BATTERY, SOLID ELECTROLYTE COMPOSITION, ELECTRODE SHEET FOR ALL-SOLID STATE SECONDARY BATTERY, ALL-SOLID STATE SECONDARY BATTERY AND METHODS FOR MANUFACTURING ELECTRODE ACTIVE MATERIAL FOR SECONDARY BATTERY, ELECTRODE SHEET FOR ALL-SOLID STATE SECONDARY BATTERY, AND ALL-SOLID STATE SECONDARY BATTERY

(71) Applicant: FUJIFILM Corporation, Tokyo (JP)

(72) Inventors: Hiroshi Kaga, Kanagawa (JP); Hiroaki Mochizuki, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 114 days.

(21) Appl. No.: 16/109,928

(22) Filed: Aug. 23, 2018

(65) Prior Publication Data

US 2018/0366728 A1 Dec. 20, 2018

Related U.S. Application Data

(63) Continuation of application No. PCT/JP2017/005545, filed on Feb. 15, 2017.

(30) Foreign Application Priority Data

Feb. 24, 2016 (JP) ............................ JP2016-032812

(51) Int. Cl.

| | |
|---|---|
| ***H01M 10/0562*** | (2010.01) |
| ***H01M 10/0585*** | (2010.01) |
| ***H01M 4/525*** | (2010.01) |
| ***H01M 4/62*** | (2006.01) |
| ***H01M 4/131*** | (2010.01) |
| ***C01G 53/00*** | (2006.01) |
| ***C01G 51/00*** | (2006.01) |
| ***H01M 4/1391*** | (2010.01) |
| ***H01M 4/36*** | (2006.01) |
| ***H01M 10/0525*** | (2010.01) |

(52) U.S. Cl.

CPC ............ *H01M 4/525* (2013.01); *C01G 51/42* (2013.01); *C01G 53/42* (2013.01); *C01G 53/54* (2013.01); *H01M 4/131* (2013.01); *H01M 4/1391* (2013.01); *H01M 4/364* (2013.01); *H01M 4/366* (2013.01); *H01M 4/622* (2013.01); *H01M 10/0525* (2013.01); *H01M 10/0562* (2013.01); *H01M 10/0585* (2013.01); *C01P 2002/32* (2013.01); *C01P 2004/50* (2013.01); *C01P 2004/61* (2013.01); *C01P 2004/62* (2013.01); *H01M 2300/0068* (2013.01); *Y02E 60/10* (2013.01); *Y02T 10/70* (2013.01)

(58) Field of Classification Search

CPC .... H01M 4/525; H01M 4/131; H01M 4/1391; H01M 4/364; H01M 4/366; H01M 4/622; H01M 10/0525; H01M 10/0585; H01M 10/0562; H01M 2300/0068; C01G 53/54; C01G 53/42; C01G 51/42; Y02E 60/122; Y02T 10/7011; C01P 2004/62; C01P 2004/61; C01P 2004/50; C01P 2002/32

See application file for complete search history.

(56) References Cited

U.S. PATENT DOCUMENTS

| | | | | |
|---|---|---|---|---|
| 2004/0029012 | A1* | 2/2004 | Tanizaki | H01M 4/505 429/231.95 |
| 2012/0134914 | A1 | 5/2012 | Paulsen et al. | |
| 2014/0287308 | A1* | 9/2014 | Okada | H01M 4/587 429/217 |
| 2015/0017549 | A1 | 1/2015 | Nishimura et al. | |
| 2015/0104704 | A1* | 4/2015 | Kim | H01M 10/0525 429/217 |
| 2016/0276664 | A1 | 9/2016 | Gunji et al. | |
| 2016/0336599 | A1* | 11/2016 | Perng | H01M 4/502 |
| 2016/0359195 | A1 | 12/2016 | Makino et al. | |
| 2018/0366728 | A1 | 12/2018 | Kaga et al. | |

FOREIGN PATENT DOCUMENTS

| | | |
|---|---|---|
| CN | 104205467 A | 12/2014 |
| CN | 108604676 A | 9/2018 |

(Continued)

OTHER PUBLICATIONS

International Search Report dated Mar. 21, 2017, issued by the International Searching Authority in PCT/JP2017/005545.

(Continued)

*Primary Examiner* — Muhammad S Siddiquee
(74) *Attorney, Agent, or Firm* — Sughrue Mion, PLLC

(57) ABSTRACT

Provided are an electrode active material for a secondary battery containing a first electrode active material and a second electrode active material, in which the first electrode active material expands during charging and contracts during discharging, the second electrode active material contracts during charging and expands during discharging, some of particles constituting the first electrode active material and some of particles constituting the second electrode active material are in contact with each other, and an interface in which the particles constituting the first active material and the particles constituting the second active material are in contact with each other forms a solid solution to form a crystal portion, a solid electrolyte composition, an electrode sheet for an all-solid state secondary battery, and an all-solid state secondary battery for which the electrode active material for a secondary battery is used, and methods for manufacturing the electrode active material for a secondary battery, an electrode sheet for an all-solid state secondary battery, and an all-solid state secondary battery.

15 Claims, 1 Drawing Sheet

(56) References Cited

FOREIGN PATENT DOCUMENTS

| | | | |
|---|---|---|---|
| JP | 5-82131 | A | 4/1993 |
| JP | 8-50895 | A | 2/1996 |
| JP | 2006-12426 | A | 1/2006 |
| JP | 2010-015942 | A | 1/2010 |
| JP | 2012-248454 | A | 12/2012 |
| JP | 2014-116296 | A | 6/2014 |
| JP | 5646088 | B1 | 12/2014 |
| JP | 2015-167126 | A | 9/2015 |
| JP | 2015-525950 | A | 9/2015 |
| WO | 2013/125485 | A1 | 8/2013 |
| WO | 2015/151606 | A1 | 10/2015 |

OTHER PUBLICATIONS

International Preliminary Report on Patentability dated Oct. 4, 2017 issued by the International Bureau in PCT/JP2017/005545.
Communication dated Jun. 25, 2019, from the Japanese Patent Office in counterpart application No. 2018-501616.
Communication dated Aug. 4, 2020, from The State Intellectual Property Office of the P.R. of China in Application No. 201780011149.1.

* cited by examiner

ELECTRODE ACTIVE MATERIAL FOR SECONDARY BATTERY, SOLID ELECTROLYTE COMPOSITION, ELECTRODE SHEET FOR ALL-SOLID STATE SECONDARY BATTERY, ALL-SOLID STATE SECONDARY BATTERY AND METHODS FOR MANUFACTURING ELECTRODE ACTIVE MATERIAL FOR SECONDARY BATTERY, ELECTRODE SHEET FOR ALL-SOLID STATE SECONDARY BATTERY, AND ALL-SOLID STATE SECONDARY BATTERY

CROSS-REFERENCE TO RELATED APPLICATIONS

This application is a Continuation of PCT International Application No. PCT/JP2017/005545 filed on Feb. 15, 2017, which claims priority under 35 U.S.C. § 119 (a) to Japanese Patent Application No. 2016-032812 filed in Japan on Feb. 24, 2016. Each of the above applications is hereby expressly incorporated by reference, in its entirety, into the present application.

BACKGROUND OF THE INVENTION

1. Field of the Invention

The present invention relates to an electrode active material for a secondary battery, a solid electrolyte composition, an electrode sheet for an all-solid state secondary battery, and an all-solid state secondary battery and methods for manufacturing an electrode active material for a secondary battery, an electrode sheet for an all-solid state secondary battery and an all-solid state secondary battery.

2. Description of the Related Art

Lithium ion secondary batteries are storage batteries which have a negative electrode, a positive electrode, and an electrolyte sandwiched between the negative electrode and the positive electrode and which can be discharged and charged by lithium ions reciprocally migrating between both electrodes. In the related art, in lithium ion secondary batteries, organic electrolytic solutions have been used as electrolytes. Regarding the above-described lithium ion secondary batteries, a variety of studies have been thus far conducted. For example, JP2015-525950A describes a lithium secondary battery having a positive electrode in which a lithium cobalt-based oxide and a lithium nickel-based complex oxide having a coating layer formed on a surface by a reaction with a fluorine-containing polymer are contained as a positive electrode active material.

However, organic electrolytic solutions are likely to cause liquid leakage, additionally, there is a concern that over-charging or over-discharging may cause short circuits and ignition in batteries, and there is a demand for further improving reliability and safety.

In such a circumstance, all-solid state secondary batteries in which an inorganic solid electrolyte is used instead of an organic electrolytic solution are attracting attention. In all-solid state secondary batteries, all of the negative electrode, the electrolyte, and the positive electrode are made of a solid, safety or reliability which is a problem of batteries in which an organic electrolytic solution is used can be significantly improved, and it becomes possible to extend the service lives of batteries. Furthermore, to all-solid state secondary batteries, it is possible to provide a structure in which electrodes and an electrolyte are disposed in series in a direct arrangement. Therefore, compared with secondary batteries in which an organic electrolytic solution is used, it becomes possible to increase the energy density, and the application to electric vehicles, large-sized storage batteries, and the like is expected.

For the above-described all-solid state secondary batteries, similar to JP2015-525950A, the use of two kinds of active materials is proposed. For example, JP2012-248454A describes an all-solid state secondary battery having a positive electrode active material layer made of a non-sintered body including first active material powder that expands during discharging and contracts during charging, second active material powder that contracts during discharging and expands during charging, and auxiliary conductive agent powder.

SUMMARY OF THE INVENTION

In recent years, rapid development has been underway for all-solid state secondary batteries, and performance required for all-solid state secondary batteries has also enhanced. Particularly, the improvement of cycle characteristics is desired from the viewpoint of long-term use. As a result of studying the improvement of cycle characteristics, in an electrode active material layer, due to the expansion and contraction of an active material caused by charging and discharging, peeling occurs between the solid particles of the active material, a binding agent, an auxiliary conductive agent, or the like, between individual layers constituting an all-solid state secondary battery, and/or between a layer and a collector, and there is a problem in that the cycle characteristics degrade.

Regarding this problem, the technique described in JP2012-248454A is expected to have an effect of improving the cycle characteristics of an all-solid state secondary battery to a certain extent. However, the active material that is used in the all-solid state secondary battery described in JP2012-248454A is simply a mixture of two kinds of positive electrode active materials, and it cannot be said that the peeling is sufficiently suppressed.

Therefore, an object of the present invention is to provide an electrode active material for a secondary battery which is used in an all-solid state secondary battery and capable of improving the cycle characteristics of the all-solid state secondary battery. In addition, another object of the present invention is to provide a solid electrolyte composition, an electrode sheet for an all-solid state secondary battery and an all-solid state secondary battery in which the electrode active material for a secondary battery is used. Furthermore, still another object of the present invention is to provide methods for manufacturing the electrode active material for a secondary battery, the electrode sheet for an all-solid state secondary battery and the all-solid state secondary battery.

As a result of intensive studies, the present inventors found that an all-solid state secondary battery containing an electrode active material for a secondary battery containing an active material that expands during charging and contracts during discharging (a first active material) and an active material that contracts during charging and expands during discharging (a second active material) in which some of particles constituting the first active material and some of particles constituting the second active material are in contact with each other, and an interface in which the particles constituting the first active material and the particles constituting the second active material are in contact with each other forms a solid solution to form a crystal portion has excellent cycle characteristics. The present invention has been completed by further repeating studies on the basis of the above-described finding.

That is, the above-described objects were achieved using the following means.

<1> An electrode active material for a secondary battery containing: a first electrode active material, and a second electrode active material, in which the first electrode active material expands during charging and contracts during discharging, the second electrode active material contracts during charging and expands during discharging, some of particles constituting the first electrode active material and some of particles constituting the second electrode active material are in contact with each other, and an interface in which the particles constituting the first electrode active material and the particles constituting the second electrode active material are in contact with each other forms a solid solution to form a crystal portion.

<2> The electrode active material for a secondary battery according to <1>, in which the first electrode active material is a lithium cobalt-based oxide, and the second electrode active material is a lithium nickel-based oxide.

<3> The electrode active material for a secondary battery according to <2>, in which the first electrode active material and the second electrode active material include a crystal phase having a bedded salt-type structure.

<4> The electrode active material for a secondary battery according to any one of <1> to <3>, in which the particles constituting the first electrode active material are coated with the particles constituting the second electrode active material.

<5> The electrode active material for a secondary battery according to any one of <1> to <3>, in which the particles constituting the second electrode active material are coated with the particles constituting the first electrode active material.

<6> A solid electrolyte composition comprising: the electrode active material for a secondary battery according to any one of <1> to <5>; and an inorganic solid electrolyte.

<7> The solid electrolyte composition according to <6>, further comprising: a binder.

<8> The solid electrolyte composition according to <7>, in which the binder has a particle shape.

<9> The solid electrolyte composition according to <7> or <8>, in which the binder is an acrylic latex, an urethane latex, or an urea latex.

<10> The solid electrolyte composition according to any one of <7> to <9>, in which the binder is a polymer having a partial structure represented by Formula (I).

Formula (I)

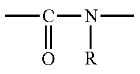

in Formula (I), R represents a hydrogen atom or a monovalent organic group.

<11> An electrode sheet for an all-solid state secondary battery comprising: a layer of the solid electrolyte composition according to any one of <6> to <10> on a collector.

<12> An all-solid state secondary battery comprising: a positive electrode active material layer; a negative electrode active material layer: and an inorganic solid electrolyte layer, in which at least one layer of the positive electrode active material layer or the negative electrode active material layer is a layer of the solid electrolyte composition according to any one of <6> to <10>.

<13> A method for manufacturing the electrode active material for a secondary battery according to any one of <1> to <5>, the method comprising: a step of forming a solid solution in the contact interface of the particles constituting the first electrode active material and the particles constituting the second electrode active material.

<14> A method for manufacturing an electrode sheet for an all-solid state secondary battery, comprising: manufacturing an electrode sheet for an all-solid state secondary battery using the method for manufacturing the electrode active material for a secondary battery according to <13>.

<15> A method for manufacturing an all-solid state secondary battery, comprising: manufacturing an all-solid state secondary battery using the method for manufacturing the electrode active material for a secondary battery according to <13>.

In the present specification, numerical ranges expressed using "to" include numerical values before and after "to" as the lower limit value and the upper limit value.

In the present specification, in the case of being simply expressed, "acryl" or "(meth)acryl" refers to methacryl and/or acryl.

The electrode active material for a secondary battery, the solid electrolyte composition, and the electrode sheet for an all-solid state secondary battery of the present invention are used to manufacture an all-solid state secondary battery, whereby it is possible to realize an all-solid state secondary battery having excellent cycle characteristics. In addition, the all-solid state secondary battery of the present invention exhibits excellent cycle characteristics.

In addition, according to the method for manufacturing an electrode active material for a secondary battery, the method for manufacturing an electrode sheet for an all-solid state secondary battery, and the method for manufacturing an all-solid state secondary battery of the present invention, it is possible to obtain the electrode active material for a secondary battery, the electrode sheet for an all-solid state secondary battery, and the all-solid state secondary battery of the present invention respectively.

The above-described characteristics and advantages and other characteristics and advantages of the present invention will be further clarified from the following description with reference to the appropriately accompanied drawings.

DESCRIPTION OF THE PREFERRED EMBODIMENTS

An electrode active material for a secondary battery of the present invention is preferably used as a material constituting an electrode sheet of an all-solid state secondary battery. That is, it is possible to prepare a solid electrolyte composition of the present invention by mixing at least the electrode active material for a secondary battery of the present invention and an inorganic solid electrolyte and use the solid electrolyte composition for the formation of a positive electrode active material layer or a negative electrode active material layer of an all-solid state secondary battery.

Hereinafter, regarding a preferred embodiment of the present invention, first, an all-solid state secondary battery in which the solid electrolyte composition of the present invention is used will be described.

[All-Solid State Secondary Battery]

An all-solid state secondary battery of the present invention has a positive electrode, a negative electrode facing the positive electrode, and a solid electrolyte layer between the positive electrode and the negative electrode. The positive electrode has a positive electrode active material layer on a positive electrode collector. The negative electrode has a negative electrode active material layer on a negative electrode collector.

At least one of the positive electrode active material layer or the negative electrode active material layer is formed of the solid electrolyte composition of the present invention.

The kinds of the components and the content ratio therebetween of the active material layers formed of the solid electrolyte composition are preferably the same as those in the solid content of the solid electrolyte composition.

Hereinafter, a preferred embodiment of the present invention will be described, but the present invention is not limited thereto.

Figure 1:
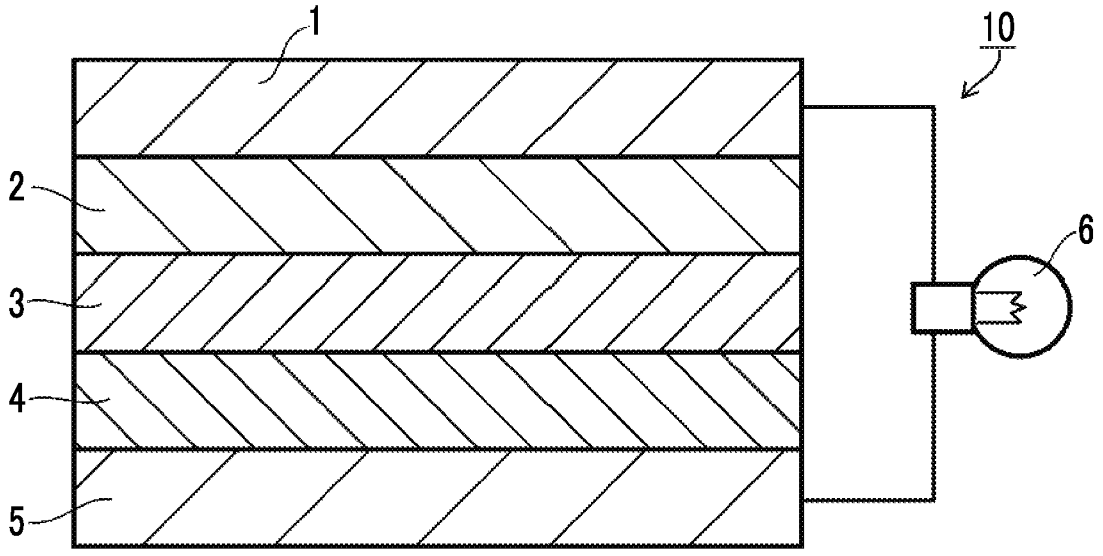
FIG. 1 is a vertical cross-sectional view schematically illustrating an all-solid state secondary battery according to a preferred embodiment of the present invention.

FIG. 1 is a cross-sectional view schematically illustrating an all-solid state secondary battery (lithium ion secondary battery) according to the preferred embodiment of the present invention. In the case of being seen from the negative electrode side, an all-solid state secondary battery 10 of the present embodiment has a structure in which a negative electrode collector 1, a negative electrode active material layer 2, a solid electrolyte layer 3, a positive electrode active material layer 4, and a positive electrode collector 5 are laminated in this order, and adjacent layers are in direct contact with each other. In a case in which the above-described structure is employed, during charging, electrons ($e^-$) are supplied to the negative electrode side, and lithium ions ($Li^+$) are accumulated thereon. On the other hand, during discharging, the lithium ions ($Li^+$) accumulated on the negative electrode return to the positive electrode side, and it is possible to supply electrons to an operation portion 6. In the example of the all-solid state secondary battery illustrated in the drawing, an electric bulb is employed as a model of the operation portion 6 and is lit by discharging. Hereinafter, there will be a case in which an all-solid state secondary battery having a layer constitution of FIG. 1 is referred to as an all-solid state secondary battery sheet.

[Positive Electrode Active Material Layer, Solid Electrolyte Layer, and Negative Electrode Active Material Layer]

In the all-solid state secondary battery 10, at least one of the positive electrode active material layer or the negative electrode active material layer are formed of the solid electrolyte composition of the present invention.

The solid electrolyte layer 3, generally, does not include any positive electrode active material and/or any negative electrode active material.

In the present invention, the positive electrode active material layer 4 includes two kinds of positive electrode active materials and/or the negative electrode active material layer 2 include two kinds of negative electrode active materials. Furthermore, the positive electrode active material layer 4 and the negative electrode active material layer 2 include an inorganic solid electrolyte. In a case in which the active material layer contains an inorganic solid electrolyte, it is possible to improve the ion conductivity.

The kinds of the inorganic solid electrolytes that the positive electrode active material layer 4, the solid electrolyte layer 3, and the negative electrode active material layer 2 contain may be identical to or different from each other.

In the present invention, there are cases in which any or both of the positive electrode active material layer and the negative electrode active material layer will be simply referred to as the active material layer or the electrode active material layer. In addition, there are cases in which any or both of the positive electrode active material and the negative electrode active material will be simply referred to as the active material or the electrode active material.

The thicknesses of the positive electrode active material layer 4, the solid electrolyte layer 3, and the negative electrode active material layer 2 are not particularly limited. In a case in which the dimensions of ordinary batteries are taken into account, the thicknesses of the respective layers are preferably 10 to 1,000 μm and more preferably 20 μm or more and less than 500 μm. In the all-solid state secondary battery of the present invention, the thickness of at least one layer of the positive electrode active material layer 4, the solid electrolyte layer 3, or the negative electrode active material layer 2 is still more preferably 50 μm or more and less than 500 μm.

[Collector (Metal Foil)]

The positive electrode collector 5 and the negative electrode collector 1 are preferably an electron conductor.

In the present invention, there are cases in which any or both of the positive electrode collector and the negative electrode collector will be simply referred to as the collector.

As a material forming the positive electrode collector, aluminum, an aluminum alloy, stainless steel, nickel, titanium, or the like, and furthermore, a material obtained by treating the surface of aluminum or stainless steel with carbon, nickel, titanium, or silver (a material forming a thin film) is preferred, and, among these, aluminum or an aluminum alloy is more preferred.

As a material forming the negative electrode collector, aluminum, copper, a copper alloy, stainless steel, nickel, titanium, or the like, and furthermore, a material obtained by treating the surface of aluminum, copper, a copper alloy, or stainless steel with carbon, nickel, titanium, or silver is preferred, and aluminum, copper, a copper alloy, or stainless steel is more preferred.

Regarding the shape of the collector, generally, collectors having a film sheet-like shape are used, but it is also possible to use net-shaped collectors, punched collectors, compacts of lath bodies, porous bodies, foaming bodies, or fiber groups, and the like.

The thickness of the collector is not particularly limited, but is preferably 1 to 500 μm. In addition, the surface of the collector is preferably provided with protrusions and recesses by means of a surface treatment.

In the present invention, a functional layer, member, or the like may be appropriately interposed or disposed between the respective layers of the negative electrode collector, the negative electrode active material layer, the solid electrolyte layer, the positive electrode active material layer, and the positive electrode collector or on the outside thereof. In addition, the respective layers may be constituted of a single layer or multiple layers.

[Chassis]

The basic structure of the all-solid state secondary battery can be produced by disposing the respective layers described above. Depending on the use, the basic structure alone may be used as an all-solid state secondary battery, but the basic structure may be used in a state of being further enclosed by an appropriate chassis in order to have a dry battery form. The chassis may be a metallic chassis or a resin (plastic) chassis. In a case in which a metallic chassis is used, examples thereof include an aluminum alloy chassis and a stainless-steel chassis. The metallic chassis is preferably classified into a positive electrode chassis and a negative electrode chassis and electrically connected to the positive electrode collector and the negative electrode collector respectively. The positive electrode chassis and the negative electrode chassis are preferably integrated by being joined together through a short circuit prevention gasket.

[Solid Electrolyte Composition]

The solid electrolyte composition of the present invention is as described above and will be specifically described below.

(Active Material)

The solid electrolyte composition of the present invention contains the electrode active material for a secondary battery of the present invention. The electrode active material for a secondary battery of the present invention contains a first electrode active material that expands during charging and contracts during discharging and a second electrode active material that contracts during charging and expands during discharging. Furthermore, in the electrode active material for a secondary battery of the present invention, some of particles constituting the first electrode active material and some of particles constituting the second electrode active material are in contact with each other, and an interface in which the particles constituting the first electrode active material and the particles constituting the second electrode active material are in contact with each other forms a solid solution to form a crystal portion. Hereinafter, there will be a case in which the first electrode active material will be referred to as the first active material, and there will be a case in which the second electrode active material will be referred to as the second active material. In addition, the particles constituting the active material will also be referred to as the active material particles.

The first active material and the second active material that are included in the electrode active material for a secondary battery of the present invention are both positive electrode active materials or both negative electrode active materials.

In a case in which the solid electrolyte composition contains the first active material and the second active material as described above, the volume changes of the active materials are offset, and the peeling of the interface between the active materials and the interface between the active material and the inorganic solid electrolyte can be suppressed. In addition, some of the first active material particles and some of the second active material particles form a solid solution to form a crystal portion, whereby the first active material particles and the second active material particles are not easily peeled off from each other, the volume changes of the active materials are efficiently offset, a decrease in the efficiency of using the active materials is suppressed, and an interface having favorable electron conductivity and favorable ion conductivity is formed. Therefore, the all-solid state secondary battery of the present invention holds the contact state between the solid particles without pressurization and is capable of extending the service life of the battery (has excellent cycle characteristics).

Here, the expression “without pressurization” refers to a case in which an all-solid state secondary battery is driven without being pressurized or an all-solid state secondary battery is driven by applying a pressure of 1 MPa or less.

Meanwhile, the aspect of the “crystal portion” is not particularly limited and may be a state in which the constituent elements of the positive (or negative) electrode active material particles partially substitute the spaces between the crystal lattices of the negative (or positive) electrode active material particles. In addition, the crystal portion may be an aspect in which the first active material particles and the second active material particles react with each other and thus a newly-formed third active material layer is present between the active material particles.

In the present specification, “forming a solid solution” refers to the fact that some of atoms occupying lattice positions are statistically substituted with a different kind of atoms without causing any changes in the crystal structure or a different kind of atoms are statistically distributed in inter-lattice positions. For example, in a case in which the active materials are metal oxides, a plurality of kinds of metal oxide particles can be made to form a solid solution by mixing a plurality of kinds of metal oxides together, then, firing the metal oxides at a high temperature, and causing element diffusion in the contact interface, but the metal oxide particles cannot be made to form a solid solution simply by pressurizing the particles.

Meanwhile, the formation of the crystal portion can be confirmed using a transmission electron microscope (TEM) and, specifically, can be confirmed according to the “determination criterion” and the “observation conditions” described in the section of examples.

Both the first active material and the second active material are preferably active materials capable of intercalating and deintercalating the ions of metal elements belonging to Group I or II of the periodic table.

Between the electrode active materials that the electrode active material for a secondary battery of the present invention contains, the first electrode active material expands during charging (expands by charging) and contracts during discharging (contracts by discharging). The reason for the first electrode active material expanding by charging is that lithium ions (positive ions) in the active material are pulled away from the crystal lattices by charging, and, between the expansion force of the lattice volume generated by the electrostatic repulsion of the skeleton of the negatively-charged crystal structure and the contraction force of the lattice volume generated by the oxidation of ions of metals other than lithium in the active material caused by charge compensation and a decrease in the ionic radii, the former force becomes dominant. In addition, the reason for the first electrode active material contracting by discharging is that lithium ions are intercalated into the crystal lattices by discharging, and, between the contraction force of the lattice volume generated by the relaxation of the electrostatic repulsion or the like and the expansion force of the lattice volume generated by the reduction of ions of metals other than lithium in the active material caused by charge compensation and an increase in the ionic radii, the former force becomes dominant. On the other hand, between the electrode active materials that the electrode active material for a secondary battery of the present invention contains, the second electrode active material contracts during charging and expands during discharging. The reason for the second electrode active material contracting by charging is that lithium ions (positive ions) in the active material are pulled away from the crystal lattices by charging, and, between the expansion force of the lattice volume generated by the electrostatic repulsion of the skeleton of the negatively-charged crystal structure and the contraction force of the lattice volume generated by the oxidation of ions of metals other than lithium in the active material caused by charge compensation and a decrease in the ionic radii, the latter force becomes dominant. In addition, the reason for the second electrode active material expanding by discharging is that lithium ions are intercalated into the crystal lattices by discharging, and, between the contraction force of the lattice volume generated by the relaxation of the electrostatic repulsion or the like and the expansion force of the lattice volume generated by the reduction of ions of metals other than lithium in the active material caused by charge compensation and an increase in the ionic radii, the latter force becomes dominant.

In the present invention, from the viewpoint of the battery performance including the capacity and the cycle characteristics, it is preferable that the first active material is a lithium cobalt-based oxide and the second active material is a lithium nickel-based oxide. Meanwhile, the lithium cobalt-based oxide refers to a compound including at least lithium, cobalt, and an oxygen atom, and examples of additional atoms that are included in the compound include transition metal elements represented by manganese and iron, aluminum, and the like. In addition, the lithium cobalt-based oxide may include nickel as long as the amount thereof is equal to the amount of cobalt or the content thereof is smaller than the content of cobalt. On the other hand, the lithium nickel-based oxide refers to a compound including at least lithium, nickel, and an oxygen atom, and examples of additional atoms that are included in the compound include transition metal elements represented by manganese and iron, aluminum, and the like. In addition, the lithium cobalt-based oxide may include cobalt as long as the amount thereof is equal to the amount of nickel or the content thereof is smaller than the content of nickel.

In the present invention, the first electrode active material particles and the second electrode active material particles preferably have the same structure since it is possible to form a solid solution to form the crystal portion by separating preparing the electrode active material particles, mixing the electrode active material particles together, and then thermally treating the mixture. In the present invention, from the viewpoint of ease of the formation of the crystal portion in the interface and the battery performance including the capacity and the cycle characteristics, particularly, the first electrode active material particles and the second electrode active material particles preferably include a crystal phase having a bedded salt-type structure.

Specific examples of the first electrode active material include $LiCoO_2$ and element-substituted products thereof. In addition, specific examples of the second electrode active material include $LiNiO_2$, $LiMn_2O_4$, and element-substituted products thereof.

The shape of the electrode active material is not particularly limited, but is preferably a particle shape. The volume average particle diameter (sphere-equivalent average particle diameter) of the electrode active material is not particularly limited. For example, the volume average particle diameters of both of the first electrode active material particles and the second electrode active material particles can be set to 0.01 to 10 μm. In the present invention, the ratio in the volume average particle diameter between the first electrode active material particles and the second electrode active material particles is not particularly limited.

In a case in which the first electrode active material particles are coated with the second electrode active material particles as described below, the ratio between the volume average particle diameter of the first electrode active material particles and the volume average particle diameter of the second electrode active material particles (the volume average particle diameter of the first electrode active material particles: the volume average particle diameter of the second electrode active material particles) is preferably 1:0.001 to 10, more preferably 1:0.01 to 10, still more preferably 1:0.1 to 1, and particularly preferably 1:0.1 to less than 1.

On the other hand, in a case in which the second electrode active material particles are coated with the first electrode active material particles as described below, the ratio between the volume average particle diameter of the second electrode active material particles and the volume average particle diameter of the first electrode active material particles is preferably 1:0.001 to 10, more preferably 1:0.01 to 10, still more preferably 1:0.1 to 1, and particularly preferably 1:0.1 to less than 1.

In the present invention, "coating" refers not only to an aspect in which all of the surfaces of particles are coated but also an aspect in which some of the surfaces of particles are coated.

In order to provide a predetermined particle diameter to the electrode active material, an ordinary crusher or classifier may be used for a sintered body of the active material particles obtained using a solid-phase method or the like. An electrode active material obtained by firing may be used after being washed with water, an acidic aqueous solution, an alkaline aqueous solution, or an organic solvent. In addition, the volume average particle diameter (sphere-equivalent average particle diameter) of the electrode active material particles can be measured using a laser diffraction/scattering-type particle size distribution measurement instrument LA-920 (trade name, manufactured by Horiba Ltd.).

Each of the first electrode active material and the second electrode active material may be used singly or two or more kinds of each of the first electrode active material and the second electrode active material may be used in combination. In addition, in the solid electrolyte composition of the present invention, some of the first electrode active material and some of the second electrode active material may agglomerate together.

In the case of forming a positive electrode active material layer, the mass (mg) of the positive electrode active material per unit area ($cm^2$) in the positive electrode active material layer (weight per unit area) is not particularly limited. The mass can be appropriately determined depending on the designed battery capacity.

The content of the electrode active material in the solid electrolyte composition is not particularly limited, but the total content of the first electrode active material and the second electrode active material is preferably 10% to 95% by mass and more particularly preferably 20% to 90% by mass with respect to 100% by mass of the solid content.

The ratio between the content of the first electrode active material and the content of the second electrode active material is not particularly limited, but is preferably 90:10 to 10:90, more preferably 80:20 to 20:80, and particularly preferably 60:40 to 40:60.

As described above, in the present invention, some of the particles constituting the first active material and some of the particles constituting the second active material are in contact with each other, and the interface in which the particles constituting the first active material and the particles constituting the second active material are in contact with each other forms a solid solution to form a crystal portion. In the interface in which the particles constituting the first active material and the particles constituting the second active material are in contact with each other, a solid solution is preferably formed in 20% or more, more preferably formed in 50% or more, and particularly preferably formed in 70% or more of the interface. The upper limit is not particularly limited, but is realistically 95% or less.

The electrode active material for a secondary battery of the present invention is not restrictively used for all-solid state secondary batteries and, for example, can be used for electrode active material layers in lithium ion non-aqueous secondary batteries in which an organic electrolytic solution is used as an electrolyte.

In the present invention, since the volume changes of the first and second active materials can be efficiently offset, the particles constituting the first active material are preferably coated with the particles constituting the second active material. Similarly, the particles constituting the second active material are also preferably coated with the particles constituting the first active material.

The electrode active material for a secondary battery of the present invention is preferably used as a positive electrode active material. In a case in which the electrode active material for a secondary battery of the present invention is used as a positive electrode active material, for the negative electrode, it is possible to use an ordinary negative electrode active material described below. In addition, in the case of being combined with an active material having a higher potential than that of the electrode active material for a secondary battery of the present invention, the electrode active material for a secondary battery of the present invention can also be used as a negative electrode active material.

Combinations of active materials other than the specific examples described above can also be used as long as the combinations satisfy the requirements of the present invention.

Hereinafter, a negative electrode active material that can be used in the negative electrode active material layer of the all-solid state secondary battery of the present invention will be described.

A negative electrode active material is preferably a negative electrode active material capable of reversibly intercalating and deintercalating lithium ions. The above-described material is not particularly limited as long as the material has the above-described characteristics, and examples thereof include carbonaceous materials, metal oxides such as tin oxide and silicon oxide, metal complex oxides, a lithium single body or lithium alloys such as lithium aluminum alloys, metals capable of forming alloys with lithium such as Sn, Si, and In and the like. Among these, carbonaceous materials or lithium complex oxides are preferably used in terms of reliability. In addition, the metal complex oxides are preferably capable of absorbing and deintercalating lithium. The materials are not particularly limited, but preferably contain titanium and/or lithium as constituent components from the viewpoint of high-current density charging and discharging characteristics.

The carbonaceous material that is used as the negative electrode active material is a material substantially made of carbon. Examples thereof include petroleum pitch, carbon black such as acetylene black (AB), graphite (natural graphite and artificial graphite such as highly oriented pyrolytic graphite), and carbonaceous material obtained by firing a variety of synthetic resins such as polyacrylonitrile (PAN)-based resins or furfuryl alcohol resins. Furthermore, examples thereof also include a variety of carbon fibers such as PAN-based carbon fibers, cellulose-based carbon fibers, pitch-based carbon fibers, vapor-grown carbon fibers, dehydrated polyvinyl alcohol (PVA)-based carbon fibers, lignin carbon fibers, glassy carbon fibers, and active carbon fibers, mesophase microspheres, graphite whisker, planar graphite, and the like.

The metal oxides and the metal complex oxides being applied as the negative electrode active material are particularly preferably amorphous oxides, and furthermore, chalcogenides which are reaction products between a metal element and an element belonging to Group XVI of the periodic table are also preferably used. The amorphous oxides mentioned herein refer to oxides having a broad scattering band having a peak of a 2θ value in a range of 20° to 40° in an X-ray diffraction method in which CuKα rays are used and may have crystalline diffraction lines. The highest intensity in the crystalline diffraction line appearing at the 20 value of 400 or more and 70° or less is preferably 100 times or less and more preferably five times or less of the diffraction line intensity at the peak of the broad scattering line appearing at the 20 value of 20° or more and 400 or less and particularly preferably does not have any crystalline diffraction lines.

In a compound group consisting of the amorphous oxides and the chalcogenides, amorphous oxides of semimetal elements and chalcogenides are more preferred, and elements belonging to Groups XIII (IIIB) to XV (VB) of the periodic table, oxides consisting of one element or a combination of two or more elements of Al, Ga, Si, Sn, Ge, Pb, Sb, and Bi, and chalcogenides are particularly preferred. Specific examples of preferred amorphous oxides and chalcogenides include $Ga_2O_3$, SiO, GeO, SnO, $SnO_2$, PbO, $PbO_2$, $Pb_2O_3$, $Pb_2O_4$, $Pb_3O_4$, $Sb_2O_3$, $Sb_2O_4$, $Sb_2O_8Bi_2O_3$, $Sb_2O_8Si_2O_3$, $Bi_2O_4$, $SnSiO_3$, GeS, SnS, $SnS_2$, PbS, $PbS_2$, $Sb_2S_3$, $Sb_2S_5$ and $SnSiS_3$. In addition, these amorphous oxides may be complex oxides with lithium oxide, for example, $Li_2SnO_2$.

The negative electrode active material preferably contains a titanium atom. More specifically, $Li_4Ti_5O_{12}$ (lithium titanium oxide [LTO]) is preferred since the volume fluctuation during the absorption and deintercalation of lithium ions is small, and thus the high-speed charging and discharging characteristics are excellent and the deterioration of electrodes is suppressed, whereby it becomes possible to improve the service lives of lithium ion secondary batteries.

The shape of the negative electrode active material is not particularly limited, but is preferably a particle shape. The average particle diameter of the negative electrode active material is preferably 0.1 to 60 μm. In order to provide a predetermined particle diameter, an ordinary crusher or classifier is used. For example, a mortar, a ball mill, a sand mill, an oscillatory ball mill, a satellite ball mill, a planetary ball mill, a swirling airflow-type jet mill, a sieve, or the like is preferably used. During crushing, it is also possible to carry out wet-type crushing in which water or an organic solvent such as methanol is made to coexist as necessary. In order to provide a desired particle diameter, classification is preferably carried out. The classification method is not particularly limited, and it is possible to use a sieve, a wind power classifier, or the like depending on the necessity. Both of dry-type classification and wet-type classification can be carried out. The average particle diameter of negative electrode active material particles can be measured using the same method as the method for measuring the volume average particle diameter of the electrode active material.

The chemical formulae of the compounds obtained using a firing method can be computed using an inductively coupled plasma (ICP) emission spectroscopic analysis method as a measurement method or from the mass difference of powder before and after firing as a convenient method.

Preferred examples of negative electrode active materials that can be jointly used with the amorphous oxide negative electrode active material mainly including Sn, Si, or Ge include carbon materials capable of absorbing and deintercalating lithium ions or lithium metal, lithium, lithium alloys, and metal capable of forming an alloy with lithium.

In the present invention, a Si-based negative electrode is preferably applied. Generally, a Si negative electrode is capable of absorbing a larger number of Li ions than carbon negative electrodes (graphite, acetylene black, and the like). That is, the amount of Li ions absorbed per unit weight increases. Therefore, it is possible to increase the battery capacity. As a result, there is an advantage that the driving time of batteries can be extended.

The negative electrode active material may be used singly or two or more negative electrode active materials may be used in combination.

In the case of forming a negative electrode active material layer, the mass (mg) of the negative electrode active material per unit area ($cm^2$) in the negative electrode active material layer (weight per unit area) is not particularly limited. The mass can be appropriately determined depending on the designed battery capacity.

The content of the negative electrode active material in the solid electrolyte composition for producing the negative electrode active material layer is not particularly limited, but is preferably 10% to 80% by mass, more particularly preferably 20% to 80% by mass, more preferably 30%/o to 80% by mass, and particularly preferably 40% to 75% by mass with respect to 100% by mass of the solid content.

(Binder)

The solid electrolyte composition of the present invention may also contain a binder. A binder that is included in the solid electrolyte composition is capable of strongly bonding the solid particles of the inorganic solid electrolytes, the active materials, and the like and, furthermore, decreasing the interface resistance between the solid particles and the like. Hereinafter, there will be a case in which a resin is used as the same terminology as a polymer.

The binder that is used in the present invention is not particularly limited as long as the binder is an organic polymer.

The binder that can be used in the present invention is preferably a binder that is generally used as a binding agent for a positive electrode or a negative electrode of a battery material and is not particularly limited. Examples of a resin constituting the binder include fluorine-based resins (for example, polytetrafluoroethylene (PTFE), polyvinylidene fluoride (PVdF), and copolymers of polyvinylidene fluoride and hexafluoropropylene (PVdF-HFP)), hydrocarbon-based resins (polyethylene, polypropylene, styrene butadiene rubber (SBR), hydrogenated styrene butadiene rubber (HSBR), butylene rubber, acrylonitrile butadiene rubber, polybutadiene, and polyisoprene), acrylic resins (preferably an acrylic latex), styrene-based resins, amide-based resins, imide-based resins, urethane-based resins (preferably urethane latex), urea-based resins (preferably urea latex), polyester-based resins, polyether-based resins, phenolic resins, epoxy resins, polycarbonate resins, silicone resins, combinations thereof, and the like.

In the present invention, the binder may be used singly or two or more binders may be used in combination.

In the present invention, at least one binder selected from the group consisting of an acrylic latex, a urethane latex, and a urea latex is preferably used from the viewpoint of the improvement of the bonding property of the electrode sheet for an all-solid state secondary battery (the improvement of the handleability of the sheet) and the battery performance.

The binder that is used in the present invention more preferably has a partial structure represented by Formula (I).

Formula (I)

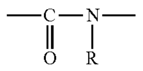

In Formula (I), R represents a hydrogen atom or a monovalent organic group.

Examples of the polymer having the partial structure represented by Formula (I) include a polymer having an amide bond, a polymer having a urea bond, a polymer having an imide bond, a polymer having a urethane bond, and the like.

In the present invention, at least one of the binders that are included in at least one layer of the positive electrode active material layer or the negative electrode active material layer preferably has the partial structure represented by Formula (I), and an all of the binders that are included in the positive electrode active material layer and the negative electrode active material layer preferably have the partial structure represented by Formula (I).

Examples of the organic group as R include an alkyl group, an alkenyl group, an aryl group, and a heteroaryl group. Among these, R is preferably a hydrogen atom.

Polymer Having Amide Bond

Examples of the polymer having an amide bond include polyamides, polyacrylamides, and the like.

The polyamide can be obtained by the condensation polymerization of a diamine compound and a dicarboxylic acid compound or the ring-opening polymerization of lactam.

Examples of the diamine compound include aliphatic diamine compounds such as ethylenediamine, 1-methylethylenediamine, 1,3-propylenediamine, tetramethylenediamine, pentamethylenediamine, heptamethylenediamine, octamethylenediamine, nonamethylenediamine, decamethylenediamine, undecamethylenediamine, dodecamethylenediamine, cyclohexanediamine, bis-(4,4'-aminohexyl)methane, and paraxylylenediamine. In addition, as a commercially available product of a diamine having a polypropyleneoxy chain, it is possible to use “JEFFAMINE” series (trade name, manufactured by Huntsman Corporation and Mitsui Fine Chemicals, Inc.). Examples of “JEFFAMINE” series include JEFFAMINE D-230, JEFFAMINE D-400. JEFFAMINE D-2000, JEFFAMINE XTJ-510, JEFFAMINE XTJ-500, JEFFAMINE XTJ-501, JEFFAMINE XTJ-502, JEFFAMINE HK-511, JEFFAMINE EDR-148, JEFFAMINE XTJ-512, JEFFAMINE XTJ-542, JEFFAMINE XTJ-533, JEFFAMINE XTJ-536, and the like.

Examples of the dicarboxylic acid compound include aliphatic dicarboxylic acids such as malonic acid, succinic acid, glutaric acid, sebacic acid, pimelic acid, suberic acid, azelaic acid, undecanoic acid, undecadionic acid, dodecadioic acid, and dimer acid, 1,4-cyclohexanedicarboxylic acid, paraxylylene dicarboxylic acid, methxylylene dicarboxylic acid, phthalic acid, 2,6-naphthalene dicarboxylic acid, and 4,4'-diphenyldicarboxylic acid.

Specific preferred examples of the polyacrylamides include polyethylene glycol monomethyl ether acrylamide, polypropylene glycol monomethyl ether acrylamide, polyethylene glycol monomethyl ether methacrylamide, polypropylene glycol monomethyl ether methacrylamide, polyester methacrylamide, polycarbonate methacrylamide, and the like.

Polymer Having Urea Bond

Examples of the polymer having a urea bond include polyurea. The polyurea can be synthesized by condensation-polymerizing a diisocyanate compound and a diamine compound in the presence of an amine catalyst.

Specific examples of the diisocyanate compound are not particularly limited, can be appropriately selected depending on the purpose, and include aromatic diisocyanate compounds such as 2,4-tolylene diisocyanate, dimers of 2,4-tolylene diisocyanate, 2,6-tolylene diisocyanate, p-xylylene diisocyanate, m-xylylene diisocyanate, 4,4'-diphenylmethane diisocyanate (MDI), 1,5-naphthylene diisocyanate, and 3,3'-dimethylbiphenyl-4,4'-diisocyanate; aliphatic diisocyanate compounds such as hexamethylene diisocyanate, trimethylhexamethylene diisocyanate, lysine diisocyanate, and dimer acid diisocyanate; alicyclic diisocyanate compounds such as isophorone diisocyanate, 4,4'-methylene bis(cyclohexyl isocyanate), methylcyclohexane-2,4 (or 2,6)-diyl diisocyanate, and 1,3-(isocyanatomethyl) cyclohexane; diisocyanate compounds that are reaction products of a diol and a diisocyanate such as an adduct of 1 mol of 1,3-butylene glycol and 2 mol of tolylene diisocyanate; and the like. These diisocyanate compounds may be used singly or two or more diisocyanate compounds may be jointly used. Among these, 4,4'-diphenylmethane diisocyanate (MDI) and 4,4'-methylene bis(cyclohexyl isocyanate) are preferred.

Specific examples of the diamine compound include the above-described examples of the compound and the like.

Polymer Having Imide Bond

Examples of the polymer having an imide bond include polyimides. The polyimide can be obtained by causing an addition reaction between tetracarboxylic dianhydride and a diamine compound so as to form a polyamic acid and then closing the ring.

Specific examples of the tetracarboxylic dianhydride include 3,3',4,4'-biphenyltetracarboxylic dianhydride (s-BPDA) and pyromellitic dianhydride (PMDA), 2,3,3',4'-biphenyltetracarboxylic dianhydride (a-BPDA), oxydiphthalic dianhydride, diphenylsulfone-3,4,3',4'-tetracarboxylic dianhydride, bis(3,4-dicarboxyphenyl) sulfide dianhydride, 2,2-bis(3,4-dicarboxyphenyl)-1,1,1,3,3,3-hexatluoropropanedianhydride, 2,3,3',4'-benzophenonetetracarboxylic dianhydride, 3,3',4,4'-benzophenonetetracarboxylic dianhydride, bis(3,4-dicarboxyphenyl)methane dianhydride, 2,2-bis(3,4-dicarboxyphenyl)propane dianhydride, p-phenylene bis(trimellitic acid monoester anhydride), p-biphenylene bis (trimellitic acid monoester anhydride), m-terphenyl-3,4,3',4'-tetracarboxylic dianhydride, p-terphenyl-3,4,3',4'-tetracarboxylic dianhydride, 1,3-bis(3,4-dicarboxyphenoxy) benzene dianhydride, 1,4-bis(3,4-dicarboxyphenoxy) benzene dianhydride, 1,4-bis(3,4-dicarboxyphenoxy) biphenyl dianhydride, 2,2-bis[(3,4-dicarboxyphenoxy) phenyl] propane dianhydride, 2,3,6,7-naphthalenetetracarboxylic dianhydride, 1,4,5,8-naphthalenetetracarboxylic dianhydride, 4,4'-(2,2-hexafluoroisopropylidene)diphthalic dianhydride, and the like. The tetracarboxylic dianhydride may be used singly or two or more tetracarboxylic dianhydrides may be used in mixture.

The polyimide preferably includes, as the tetracarboxylic acid component, at least one of s-BPDA or PMDA, and, for example, the content of s-BPDA is preferably 50 mol % or more, more preferably 70 mol % or more, and particularly preferably 75 mol % or more with respect to 100 mol % of the tetracarboxylic acid component. The tetracarboxylic dianhydride preferably has a rigid benzene ring.

Specific examples of the diamine compound include the above-described examples of the compound and the like.

The diamine compound is preferably a structure having amino groups at both terminals of a polyethylene oxide chain, a polypropylene oxide chain, a polycarbonate chain, or a polyester chain.

Polymer Having Urethane Bond

Examples of the polymer having a urethane bond include polyurethane. The polyurethane can be obtained by the condensation polymerization of a diisocyanate compound and a diol compound in the presence of titanium, tin, and a bismuth catalyst.

Examples of the diisocyanate compound include the above-described examples of the compound.

Specific examples of the diol compound include ethylene glycol, diethylene glycol, triethylene glycol, tetraethylene glycol, propylene glycol, dipropylene glycol, polyethylene glycol (for example, polyethylene glycol having an average molecular weight of 200, 400, 600, 1,000, 1,500, 2,000, 3,000, or 7,500), polypropylene glycol (for example, polypropylene glycol having an average molecular weight of 400, 700, 1,000, 2,000, 3,000, or 4,000), neopentyl glycol, 1,3-butylene glycol, 1,4-butanediol, 1,3-butanediol, 1,6-hexanediol, 2-butene-1,4-diol, 2,2,4-trimethyl-1,3-pentanediol, 1,4-bis-β-hydroxyethoxycyclohexane, cyclohexanedimethanol, tricyclodecanedimethanol, hydrogenated bisphenol A, hydrogenated bisphenol F, ethylene oxide adducts of bisphenol A, propylene oxide adducts of bisphenol A, ethylene oxide adducts of bisphenol F, propylene oxide adducts of bisphenol F, and the like.

The diol compound can be procured from commercially available products, and examples thereof include a polyether diol compound, a polyester diol compound, a polycarbonate diol compound, a polyalkylene diol compound, and a silicone diol compound.

The diol compound preferably has at least one of a polyethylene oxide chain, a polypropylene oxide chain, a polycarbonate chain, a polyester chain, a polybutadiene chain, a polyisoprene chain, a polyalkylene chain, or a silicone chain. In addition, from the viewpoint of the improvement of the adsorption property to sulfide-based solid electrolyte or active materials, the diol compound preferably has a carbon-carbon unsaturated bond or a polar group (an alcoholic hydroxyl group, a phenolic hydroxyl group, a thiol group, a carboxy group, a sulfonic acid group, a sulfonamide group, a phosphoric acid group, a nitrile group, an amino group, a zwitter ion-containing group, a metal hydroxide, or a metal alkoxide). As the diol compound, it is possible to use 2,2-bis(hydroxymethyl)propionate. As a commercially available product of the diol compound having a carbon-carbon unsaturated bond, it is possible to preferably use BLEMMER GLM (manufactured by NOF Corporation) and the compound described in JP2007-187836A.

In the case of the polyurethane, as a polymerization terminator, it is possible to use a monoalcohol or a monoamine. The polymerization terminator is introduced into the terminal portion of a polyurethane main chain. As a method for introducing a soft segment into a polyurethane terminal, it is possible to use polyalkylene glycol monoalkyl ether (preferably polyethylene glycol monoalkyl ether or polypropylene monoalkyl ether), polycarbonate diol monoalkyl ether, polyester diol monoalkyl ether, polyester monoalcohol, or the like.

In addition, in a case in which a monoalcohol or monoamine having a polar group or a carbon-carbon unsaturated bond is used, it is possible to introduce the polar group or the carbon-carbon unsaturated bond into a terminal of the polyurethane main chain. Examples thereof include hydroxyacetic acid, hydroxypropionic acid, 4-hydroxybenzyl alcohol, 3-mercapto-1 propanol, 2,3-dimercapto-1-propanol, 3-mercapto-1-hexanol, 3-hydroxypropanesulfonic acid, 2-cyanoethanol, 3-hydroxyglutaronitrile, 2-aminoethanol, 2-hydroxyethyl methacrylate, 2-hydroxyethyl acrylate, N-methacrylylene diamine, and the like.

The binder that is used in the present invention is also preferably polymer particles holding a particle shape. Compared with binders having a non-particle shape, the binder holding a particle shape does not easily allow the formation of an excess coating on the active materials or the solid electrolyte and enables the suppression of battery resistance at a low level without impairing the ion conductivity.

Here, the "polymer particles" refer to particles which are not completely dissolved even in the case of being added to a dispersion medium described below, are dispersed in the dispersion medium while maintaining the particle shape, and exhibit an average particle diameter of more than 0.01 μm.

The average particle diameter of the polymer particles is preferably 0.01 μm to 100 μm, more preferably 0.05 μm to 50 μm, and still more preferably 0.05 μm to 20 μm. The average particle diameter is preferably in the preferred range described above from the viewpoint of the improvement of the output density.

In the present invention, at least one of binders that are included in at least one of the positive electrode active material layer or the negative electrode active material layer is preferably polymer particles having an average particle diameter of 0.05 μm to 20 μm, and all of the binders that are included in the positive electrode active material layer and the negative electrode active material layer are preferably polymer particles having an average particle diameter of 0.05 μm to 20 μm.

Unless particularly otherwise described, the average particle diameter of the polymer particles that are used in the present invention refers to an average particle diameter according to measurement conditions and a definition described below.

One percent by mass of a dispersion liquid is prepared by diluting the polymer particles using a random solvent (a dispersion medium that is used to prepare the solid electrolyte composition, for example, heptane) in a 20 ml sample bottle. The diluted dispersion specimen is irradiated with 1 kHz ultrasonic waves for 10 minutes and then immediately used for testing. Data capturing is carried out 50 times using this dispersion liquid specimen, a laser diffraction/scattering-type particle size distribution measurement instrument LA-920 (trade name, manufactured by Horiba Ltd.), and a silica cell for measurement at a temperature of 25° C., thereby obtaining a volume average particle diameter which is used as the average particle diameter. Regarding other detailed conditions and the like, the description of JIS Z8828:2013 "Particle size analysis-Dynamic light scattering method" is referred to as necessary. Five specimens are produced and measured per level, and the average values thereof are employed.

Meanwhile, the average particle diameter can be measured from the produced all-solid state secondary battery by, for example, disassembling the battery, peeling the electrodes, measuring the average particle diameters of the electrode materials according to the above-described method for measuring the average particle diameter of the polymer particles, and excluding the measurement value of the average particle diameter of particles other than the polymer particles which has been measured in advance.

The structure of the polymer particles is not particularly limited as long as the polymer particles are organic polymer particles. Examples of a resin constituting the organic polymer particles include the resins described as the resin constituting the binder, and the preferred resins are also applied.

The shape of the polymer particle is not limited as long as the polymer particle hold a solid form. The polymer particles may be monodispersed or polydispersed. The polymer particle may have a truly spherical shape or a flat shape and, furthermore, may have an irregular shape. The surface of the polymer particle may be flat or form an uneven shape. The polymer particle may have a core-shell structure, and the core (inner core) and the shell (outer shell) may be constituted of the same material or may be constituted of different materials. In addition, the polymer particle may be hollow, and the hollow rate is also not limited.

The polymer particles can be synthesized using a method in which the polymer particles are polymerized in the presence of a surfactant, an emulsifier, or a dispersant or a method in which the polymer particles are precipitated in a crystal shape as the molecular weight increases.

In addition, a method in which the existing polymer is mechanically crushed or a method in which fine particles are produced from a polymer liquid by means of re-precipitation may be used.

As the polymer particles, it is possible to use, for example, commercially available products, and specific examples thereof include commercially available products described below (all are expressed by trade names, and numerical values in parentheses represent average particle diameters). Polymer particles that can be used in the present invention are not limited thereto.

Fluorine-Based Resin Particles

MICRODISPERSE series (manufactured by Techno Chemical Corporation, for example, MICRODISPERSE-200 (PTFE particles, 200 nm), MICRODISPERSE-3000 (PTFE particles, 3 μm), and MICRODISPERSE-8000 (PTFE particles, 8 μm)), DISPERSE EASY-300 (PTFE particles, 200 nm, manufactured by Techno Chemical Corporation), Fluon AD series (manufactured by Asahi Glass Co., Ltd., for example, Fluon AD 911E, Fluon AD 915E, Fluon AD 916E, and Fluon AD 939E), ARGOFLON series (manufactured by Solvay, Ltd., ARGOFLON F (PTFE particles, 15 to 35 μm) and ARGOFLON S (PTFE particles, 15 to 35 μm)), LUBRON series (manufactured by Daikin Industries, Ltd., for example, LUBRON L-2 (PTFE particles, 3.5 μm), LUBRON L-5 (PTFE particles, 5 μm), LUBRON L-5F (PTFE particles, 4.5 μm))

Hydrocarbon-Based Resin Particles

Soft beads. ZAIKTHENE (polyolefin emulsion), SEPOLSION G (polyolefin emulsion), SEPOLEX IR100 (polyisoprene latex), SEPOLEX CSM (chlorosulfonated polyethylene latex), FLO-THENE (polyethylene powder), FLO-THENE UF (polyethylene powder), FLOBLEN (polypropylene powder), FLO-BEADS (polyethylene-acrylic copolymer powder) (all manufactured by Sumitomo Seika Chemicals Co., Ltd.)

Acrylic Resin Particles

ART-PEARL series (manufactured by Negami Chemical Industrial Co., Ltd., for example, ART-PEARL GR, ART-PEARL SE, ART-PEARL G, ART-PEARL GR, ART-PEARL GS, ART-PEARL J, ART-PEARL MF, ART-PEARL BE), TAFTIC series (manufactured by Toyobo Co., Ltd., for example, TAFTIC AR-650, TAFTIC AR-750, TAFTIC FH-S), CHEMISNOW series (manufactured by Soken Chemical & Engineering Co., Ltd., for example, CHEMISNOW MP-1451, CHEMISNOW MP-2200, CHEMISNOW MP-1000, CHEMISNOW MP-2701, CHEMISNOW MP-5000, CHEMISNOW MP-5500, CHEMISNOW MP-300, CHEMISNOW KMR-3TA, CHEMISNOW MX-80H3wT, CHEMISNOW MX-150, CHEMISNOW MX-180TA, CHEMISNOW MX-300, CHEMISNOW MX-500, CHEMISNOW MX-500H, CHEMISNOW MX-1000, CHEMISNOW MX-1500H, CHEMISNOW MX-2000, CHEMISNOW MX-3000), FS series (manufactured by NIPPONPAINT Co., Ltd., for example, FS-101, FS-102, FS-106, FS-107, FS-201, FS-301, FS-501, FS-701), MG series (manufactured by NIPPONPAINT Co., Ltd., for example, MG-155E, MG-451, MG-351), TECHPOLYMER series (manufactured by Sekisui Plastics Co., Ltd., for example, TECHPOLYMER MBX, TECHPOLYMER SBX, TECHPOLYMER MSX, TECHPOLYMER SSX, TECHPOLYMER BMX. TECHPOLYMER ABX, TECHPOLYMER ARX, TECHPOLYMER AFX, TECHPOLYMER MB, TECHPOLYMER MBP), ADVANCEL HB-2051 (manufactured by Sekisui Chemical Co., Ltd.), HAYABEADS L-11, HAYABEADS M-11 (all manufactured by Hayakawa Rubber Co., Ltd.), ARON T series, ARON A series, ARON SD-10, ARON AC series, JURYMER AC series (all manufactured by Toagosei Co., Ltd.), EPOSTAR MA, EPOSTAR MX (all manufactured by Nippon Shokubai Co., Ltd.)

As the acrylic resin particles, it is also preferable to use the acrylic resin particles described in WO2015/046314A.

Styrene-Based Resin Particles

CHEMISNOW KSR-3A (manufactured by Soken Chemical & Engineering Co., Ltd.) EPOSTAR ST (manufactured by Nippon Shokubai Co., Ltd.)

Amide-Based Resin Particles

SEPOLSION PA (copolymerized nylon emulsion, manufactured by Sumitomo Seika Chemicals Co., Ltd.), TORAYPEARL PAI (polyamide-imide particles, manufactured by Toray Industries, Inc.)

Imide-Based Resin Particles

Polyimide powder P84 (R) NT (manufactured by Daicel-Evonik Ltd.), polyimide powder PIP-3, polyimide powder PIP-25, polyimide powder PIP-60 (all manufactured by Seishin Enterprise Co., Ltd.), polyimide powder UIP-R, polyimide powder UIP-S (all manufactured by Ube Industries, Ltd.)

Urethane-Based Resin Particles

DAIMICBEAZS UCN-8070CM (7 μm), DAIMICBEAZS UCN-8150CM (15 μm), (all manufactured by Dainichiseika Color & Chemicals Mfg. Co., Ltd.), ART-PEARL series (manufactured by Negami Chemical Industrial Co., Ltd., for example, ART-PEART. C, ART-PEARL P, ART-PEARL JB, ART-PEARL U, ART-PEARL CE, ART-PEARL AK, ART-PEARL HI, ART-PEARL MM, ART-PEARL FF, ART-PEARL TK, ART-PEARL C-TH, ART-PEARL RW, ART-PEARL RX, ART-PEARL RY. ART-PEARL RZ, ART-PEARL RU, ART-PEARL RV, ART-PEARL BP), GLOSSDELL S series, GLOSSDELL M series, GLOSSDELL V series, GLOSSDELL T series (all manufactured by Mitsui Chemicals, Inc.)

INFINERGY (manufactured by BASF)

Urea-Based Resin Particles

As the urea-based resin particles, the particles of the polymer having an urea bond described in WO2015/046313A are preferably used.

Polyester-Based Resin Particles

SEPOLSION ES (copolymerized polyester emulsion, manufactured by Sumitomo Seika Chemicals Co., Ltd.)

Polyether-Based Resin Particles

TORAYPEARL PPS (polyphenylene sulfide particles, manufactured by Toray Industries, Inc.), TORAYPEARL PES (polyether sulfone particles, manufactured by Toray Industries, Inc.)

Phenolic Resin Particles

LPS series (manufactured by Lignyte Inc.), MARLIN FM series (manufactured by Gunei Chemical Industry Co., Ltd.), MARLIN HF series (manufactured by Gunei Chemical Industry Co., Ltd.)

Epoxy Resin Particles

TORAYPEARL EP (epoxy resin particles, manufactured by Toray Industries, Inc.)

Polycarbonate Resin Particles

The polycarbonate resin particles can be synthesized using, for example, the method described in WO2011/004730A. Specifically, the polycarbonate resin particles can be polymerized by reacting carbon dioxide with an epoxy compound.

Silicone Resin Particles

SEAHOSTAR KE series (manufactured by Nippon Shokubai Co., Ltd., for example, SEAHOSTAR KE-E series, SEAHOSTAR KE-W series, SEAHOSTAR KE-P series, SEAHOSTAR KE-S series), silicone composite powder series (for example, silicone composite powder KMP-600, silicone composite powder KMP-601, silicone composite powder KMP-602, silicone composite powder KMP-605, silicone composite powder X-52-7030), silicone resin power series (for example, silicone resin powder KMP-590, silicone resin powder KMP-701, silicone resin powder X-52-854, silicone resin powder X-52-1621), silicone rubber powder series (for example, silicone rubber powder KMP-597, silicone rubber powder KMP-598, silicone rubber powder KMP-594, silicone rubber powder X-52-875) (all manufactured by Shin-Etsu Chemical Co., Ltd.), CHALINE R-170S (silicone acryl copolymerized, manufactured by Nissin Chemical Co., Ltd.)

Regarding the glass transition temperature of the binder, the upper limit is preferably 50° C. or lower, more preferably 0° C. or lower, and particularly preferably −20° C. or lower. The lower limit is preferably −100° C. or higher, more preferably −70° C. or higher, and particularly preferably −50° C. or higher.

The glass transition temperature (Tg) is measured using a dried specimen and a differential scanning calorimeter "X-DSC7000" (trade name, manufactured by SII•NanoTechnology Inc.) under the following conditions. The glass transition temperature of the same specimen is measured twice, and the measurement result of the second measurement is employed.

Atmosphere in the measurement chamber: Nitrogen (50 mL/min)

Temperature-increase rate: 5° C./min

Measurement-start temperature: −100° C.

Measurement-end temperature: 200° C.

Specimen pan: Aluminum pan

Mass of the measurement specimen: 5 mg

Calculation of Tg: Tg is calculated by rounding off the middle temperature between the declination-start point and the declination-end point in the DSC chart to the integer.

The polymer (preferably polymer particles) constituting the binder that is used in the present invention preferably has a moisture concentration of 100 ppm or less (mass-based) and a Tg of 100° C. or lower.

In addition, the polymer constituting the binder that is used in the present invention may be dried by being crystallized or may be used in a polymer solution form. The amount of a metal-based catalyst (a tin, titanium, or bismuth catalyst that is a urethanization or polyesterification catalyst) is preferably small. The concentration of metal in copolymers is preferably set to 100 ppm or less (mass-based) by decreasing the amount of the metal during polymerization or removing the catalyst by means of crystallization.

The solvent that is used for the polymerization reaction of the polymer is not particularly limited. Meanwhile, solvents that do not react with the inorganic solid electrolyte or the active materials and furthermore do not decompose the inorganic solid electrolyte or the active materials are desirably used. For example, it is possible to use hydrocarbon-based solvents (toluene, heptane, and xylene), ester-based solvents (ethyl acetate and propylene glycol monomethyl ether acetate), ether-based solvents (tetrahydrofuran, dioxane, and 1,2-diethoxyethane), ketone-based solvents (acetone, methyl ethyl ketone, and cyclohexanone), nitrile-based solvents (acetonitrile, propionitrile, butyronitrile, and isobutyronitrile), halogen-based solvents (dichloromethane and chloroform), and the like.

The mass-average molecular weight of the polymer constituting the binder that is used in the present invention is preferably 10,000 or more, more preferably 20,000 or more, and still more preferably 50,000 or more. The upper limit is preferably 1,000,000 or less, more preferably 200,000 or less, and still more preferably 100,000 or less.

In the present invention, the molecular weight of the polymer refers to the mass-average molecular weight unless particularly otherwise described. The mass-average molecular weight can be measured as the polystyrene-equivalent molecular weight by means of GPC. At this time, the polystyrene-equivalent molecular weight is detected by means of RI using a GPC apparatus HLC-8220 (manufactured by Tosoh Corporation) and G3000HXL+G2000HXL as columns at 23° C. and a flow rate of 1 mL/min. An eluent can be selected from tetrahydrofuran (THF), chloroform, N-methyl-2-pyrrolidone (NMP), and m-cresol/chloroform (manufactured by Shonanwako Junyaku), and THF is used in a case in which the polymer needs to be dissolved.

In a case in which favorable interface resistance-reducing and maintaining properties are taken into account in the all-solid state secondary battery, the content of the binder in each layer of the positive electrode active material layer and the negative electrode active material layer is preferably 0.01% by mass or more, more preferably 0.1% by mass or more, and still more preferably 1% by mass or more with respect to all of the solid components of the layer in which the binder is included. From the viewpoint of battery characteristics, the upper limit is preferably 10% by mass or less, more preferably 5% by mass or less, still more preferably 3% by mass or less, and particularly preferably 2% by mass or less.

(Inorganic Solid Electrolyte)

The solid electrolyte composition of the present invention may also contain an inorganic solid electrolyte.

A "solid electrolyte" of the inorganic solid electrolyte refers to a solid-form electrolyte capable of migrating ions therein. The solid electrolyte is clearly differentiated from organic solid electrolytes (polymer electrolytes represented by polyethylene oxide (PEO) or the like and organic electrolyte salts represented by lithium bis(trifluoromethanesulfonyl) imide (LiTFSI)) since the solid electrolyte does not include any organic substances as a principal ion-conductive material. In addition, the inorganic solid electrolyte is a solid in a static state and is thus not disassociated or liberated into cations and anions. Due to this fact, the inorganic solid electrolyte is also clearly differentiated from inorganic electrolyte salts which are disassociated or liberated into cations and anions in electrolytic solutions or polymers ($LiPF_6$, $LiBF_4$, lithium bis(fluorosulfonyl) imide (LiFSI), LiCl, and the like). The inorganic solid electrolyte is not particularly limited as long as the inorganic solid electrolyte has conductivity for ions of metal elements belonging to Group I or II of the periodic table and is generally a substance not having electron conductivity. In a case in which the all-solid state secondary battery of the present invention is a lithium ion battery, the inorganic solid electrolyte preferably has ion conductivity for lithium ions.

As the inorganic solid electrolyte, it is possible to appropriately select and use solid electrolyte materials that are generally used in all-solid state secondary batteries. Typical examples of the inorganic solid electrolyte include (i) sulfide-based inorganic solid electrolytes and (ii) oxide-based inorganic solid electrolytes.

(i) Sulfide-Based Inorganic Solid Electrolytes

The sulfide-based inorganic solid electrolyte preferably contains a sulfur atom (S), has an ion conductivity of a metal element belonging to Group I or II of the periodic table, and has an electron-insulating property. The sulfide-based inorganic solid electrolyte preferably contains at least Li and S as elements and has a lithium ion conductivity, but may include an element other than Li and S depending on the purpose or case.

Examples thereof include lithium ion-conductive inorganic solid electrolytes satisfying a composition represented by Formula (1), which are preferred.

$$L_{a1}M_{b1}S_{c1}A_{d1} \quad (1)$$

In the formula, L represents an element selected from Li, Na, and K and is preferably Li.

M represents an element selected from B, Zn, Sn, Si, Cu, Ga, Sb, Al, P, Ge, In, As, V, Nb, Ta, Ti, and Zr. Among these, B, Sn, Si, Al, P, or Ge is preferred, and Sn, Al, P, or Ge is more preferred.

A represents I, Br, Cl, and F and is preferably I or Br and particularly preferably I.

As L, M, and A, it is possible to use one or more elements described above respectively.

a1 to d1 represent the compositional ratios among the respective elements, and a1:b1:c1:d1 satisfies 1 to 12:0 to 2:2 to 12:0 to 5. Furthermore, a1 is preferably 1 to 9 and more preferably 1.5 to 4. b1 is preferably 0 to 1. Furthermore, c1 is preferably 3 to 7 and more preferably 3.25 to 4.5. Furthermore, d1 is preferably 0 to 3 and more preferably 0 to 1.

The compositional ratios among the respective elements can be controlled by adjusting the amounts of raw material compounds blended to manufacture the sulfide-based inorganic solid electrolyte as described below.

The sulfide-based inorganic solid electrolyte may be non-crystalline (glass) or crystallized (made into glass ceramic) or may be only partially crystallized. For example, it is possible to use Li—P—S-based glass containing Li, P, and S or Li—P—S-based glass ceramic containing Li, P, and S.

The sulfide-based inorganic solid electrolytes can be manufactured from a reaction between [1] lithium sulfide ($Li_2S$) and phosphorus sulfide (for example, diphosphorus pentasulfide ($P_2S_5$)), [2] lithium sulfide and at least one of a phosphorus single body or a sulfur single body, or [3] lithium sulfide, phosphorus sulfide (for example, diphosphorus pentasulfide ($P_2S_5$)), and at least one of a phosphorus single body or a sulfur single body.

The ratio between $Li_2S$ and $P_2S$ in the Li—P—S-based glass and the Li—P—S-based glass ceramic is preferably 65:35 to 85:15 and more preferably 68:32 to 77:23 in terms of the molar ratio between $Li_2S$:$P_2S_5$. In a case in which the ratio between $Li_2S$ and $P_2S_5$ is set in the above-described range, it is possible to further increase the lithium ion conductivity. Specifically, the lithium ion conductivity can be preferably set to $1\times10^{-4}$ S/cm or more and more preferably set to $1\times10^{-3}$ S/cm or more. The upper limit is not particularly limited, but realistically $1\times10^{-1}$ S/cm or less.

Examples of the specific compounds of the sulfide-based inorganic solid electrolyte include compounds obtained using a raw material composition containing $Li_2S$ and a sulfide of an element belonging to Groups XIII to XV. More specific examples thereof include $Li_2S$—$P_2S_5$, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S$—$P_2O_5$, $Li_2S$—$P_2S_5$—$SiS_2$, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$P_2S_5$—LiI, $Li_2S$—$SiS_2$—LiI, $Li_2S$—$SiS_2$—$Li_4SiO_4$, $Li_2S$—$SiS_2$—$Li_3PO_4$, $Li_{10}GeP_2S_{12}$, and the like. Among these, crystal, amorphous, or crystal and amorphous-mixed raw material compositions made of $Li_2S$—$P_2S_5$, $Li_2S$—$GeS_2$—$Ga_2S_3$, $Li_2S$—$SiS_2$—$P_2S_5$, $Li_2S$—$SiS_2$—$Li_4SiO_4$, $Li_2S$—$SiS_2$—$Li_3PO_4$, $Li_2S$—LiI—$Li_2O$—$P_2S_5$, $Li_2S$—$Li_2O$—$P_2S_5$, $Li_2S$—$Li_3PO_4$—$P_2S_5$, $Li_2S$—$GeS_2$—$P_2S_5$, or $Li_{10}GeP_2S_{12}$ are preferred due to their high lithium ion conductivity. Examples of a method for synthesizing a sulfide-based inorganic solid electrolyte material using the above-described raw material composition include an amorphization method. Examples of the amorphization method include a mechanical milling method, and a melting quenching method. Among these, the mechanical milling method is preferred. This is because treatments at a normal temperature become possible, and it is possible to simplify manufacturing steps.

Among these, $Li_2S$—$P_2S_5$, LGPS ($Li_{10}GeP_2S_{12}$), $Li_2S$—$P_2S_5$—$SiS_2$, and the like are preferred.

(ii) Oxide-Based Inorganic Solid Electrolytes

Oxide-based inorganic solid electrolytes are preferably solid electrolytes which contain oxygen atoms (O), have an ion conductivity for metal elements belonging to Group I or II of the periodic table, and have electron-insulating properties.

The ion conductivity for the oxide-based inorganic solid electrolyte is preferably $1\times10^{-6}$ S/cm or more, more preferably $5\times10^{-6}$ S/cm or more, and particularly preferably $1\times10^{-5}$ S/cm or more. The upper limit is not particularly limited, but is realistically $1\times10^{-1}$ S/cm or less.

Specific examples of the compounds include $Li_{xa}La_{ya}TiO_3$ [xa satisfies $0.35\leq xa\leq0.7$ and ya satisfies $0.35\leq ya\leq0.7$] (LLT); $Li_{xb}La_{yb}Zr_{zb}M^{bb}_{mb}O_{nb}$ ($M^{bb}$ is at least one element selected from Al, Mg, Ca, Sr, V, Nb, Ta, Ti, Ge, In and Sn, xb satisfies $5\leq xb\leq10$, yb satisfies $1\leq yb\leq4$, zb satisfies $1\leq zb\leq4$, mb satisfies $0\leq mb\leq2$, and nb satisfies $5\leq nb\leq20$); $Li_{xc}B_{yc}M^{cc}_{zc}O_{nc}$ ($M^{cc}$ is at least one element selected from C, S, Al, Si, Ga, Ge, In, and Sn, xc satisfies $0\leq xc\leq5$, yc satisfies $0\leq yc\leq1$, zc satisfies $0\leq zc\leq1$, and nc satisfies $0\leq nc\leq6$); $Li_{xd}(Al, Ga)_{yd}(Ti, Ge)_{zd}Si_{ad}P_{md}O_{nd}$ (xd satisfies $1\leq xd\leq3$, yd satisfies $0\leq yd\leq1$, zd satisfies $0\leq zd\leq2$, ad satisfies $0\leq ad\leq1$, md satisfies $1\leq md\leq7$, and nd satisfies $3\leq nd\leq13$); $Li_{(3-2xe)}M^{cc}_{xe}D^{ee}O$ (xe represents a number of 0 or more and 0.1 or less, and $M^{ee}$ represents a divalent metal atom. $D^{ee}$ represents a halogen atom or a combination of two or more halogen atoms): $Li_{xf}Si_{yf}O_{zf}$ (xf satisfies $1\leq xf\leq5$, yf satisfies $0\leq yf\leq3$, and zf satisfies $1\leq zf\leq10$), $Li_{xg}S_{yg}O_{zg}$ (xg satisfies $1\leq xg\leq3$, yg satisfies $0<yg\leq2$, and zg satisfies $1\leq zg\leq10$); $Li_3BO_3$; $Li_3BO_3$—$Li_2SO_4$; $Li_2O$—$B_2O_3$—$P_2O_5$; $Li_2O$—$SiO_2$; $Li_6BaLa_2Ta_2O_{12}$; $Li_3PO_{(4-3/2w)}N_w$ (w satisfies w<1); $Li_{3.5}Zn_{0.25}GeO_4$ having a lithium super ionic conductor (LISICON)-type crystal structure; $La_{0.55}Li_{0.35}TiO_3$ having a perovskite-type crystal structure; $LiTi_2P_3O_{12}$ having a natrium super ionic conductor (NASICON)-type crystal structure; $Li_{1+xh+yh}(Al, Ga)_{xh}(Ti, Ge)_{2-xh}Si_{yh}P_{3-yh}O_{12}$ (xh satisfies $0\leq xh\leq1$ and yh satisfies $0\leq yh\leq1$); $Li_7La_3Zr_2O_{12}$ (LLZ) having a garnet-type crystal structure.

In addition, phosphorus compounds containing Li, P, and O are also desirable. Examples thereof include lithium phosphate ($Li_3PO_4$); LiPON in which some of oxygen atoms in lithium phosphate are substituted with nitrogen, $LiPOD^1$ ($D^1$ is preferably one or more elements selected from Ti, V, Cr, Mn, Fe, Co, Ni, Cu, Zr, Nb, Mo, Ru, Ag, Ta, W, Pt, and Au); and the like.

Furthermore, it is also possible to preferably use $LiA^1ON$ ($A^1$ is one or more elements selected from Si, B, Ge, Al, C, and Ga) and the like.

Among these, LLT, $Li_{xb}La_{yb}Zr_{zb}M^{bb}_{mb}O_{nb}$ ($M^{bb}$, xb, yb, zb, mb, and nb are as described above), LLZ, $Li_3BO_3$; $Li_3BO_3$—$Li_2SO_4$, and $Li_{xd}(Al, Ga)_{yd}(Ti, Ge)_{zd}Si_{ad}P_{md}O_{nd}$ (xd, yd, zd, ad, md, and nd are as described above) are preferred, and LLZ, LLT, LAGP ($Li_{1.5}Al_{0.5}Ge_{1.5}(PO_4)_3$), or LATP ([$Li_{1.4}Ti_2Si_{0.4}P_{2.6}O_{12}$]—$AlPO_4$) are more preferred.

The inorganic solid electrolyte is preferably particles. The volume average particle diameter of the particulate inorganic solid electrolyte is not particularly limited, but is preferably 0.01 μm or more and more preferably 0.1 μm or more. The upper limit is preferably 100 μm or less and more preferably 50 μm or less. Meanwhile, the volume average particle diameter of the inorganic solid electrolyte is measured in the following order. One percent by mass of a dispersion liquid is diluted and prepared using the inorganic solid electrolyte particles and water (heptane in a case in which the inorganic solid electrolyte is unstable in water) in a 20 mL sample bottle. The diluted dispersion specimen is irradiated with 1 kHz ultrasonic waves for 10 minutes and is then immediately used for testing. Data capturing is carried out 50 times using this dispersion liquid specimen, a laser diffraction/scattering-type particle size distribution measurement instrument LA-920 (trade name, manufactured by Horiba Ltd.), and a silica cell for measurement at a temperature of 25° C., thereby obtaining the volume average particle diameter. Regarding other detailed conditions and the like, the description of JIS Z8828:2013 "Particle size analysis-Dynamic light scattering method" is referred to as necessary. Five specimens are produced and measured per level, and the average values thereof are employed.

In a case in which the satisfaction of both the battery performance and the interface resistance-reducing and maintaining effect is taken into account, the content of the inorganic solid electrolyte in the solid electrolyte composition is preferably 5% by mass or more, more preferably 10% by mass or more, and particularly preferably 20% by mass or more with respect to 100% by mass of the solid content. From the same viewpoint, the upper limit is preferably 99.9% by mass or less, more preferably 99.5% by mass or less, and particularly preferably 99% by mass or less.

Meanwhile, the solid content in the present specification refers to a component that does not disappear due to volatilization or evaporation in the case of being dried at 170° C. for six hours in a nitrogen atmosphere. Typically, the solid content indicates components other than a dispersion medium described below.

The inorganic solid electrolyte may be used singly or two or more inorganic solid electrolytes may be used in combination.

(Dispersion Medium)

The solid electrolyte composition of the present invention preferably contains a dispersion medium.

The dispersion medium needs to be capable of dispersing the respective components described above, and examples thereof include a variety of organic solvents. Specific examples of the dispersion medium include dispersion media described below.

Examples of alcohol compound solvents include methyl alcohol, ethyl alcohol, 1-propyl alcohol, 2-propyl alcohol, 2-butanol, ethylene glycol, propylene glycol, glycerin, 1,6-hexanediol, cyclohexanediol, sorbitol, xylitol, 2-methyl-2,4-pentanediol, 1,3-butanediol, and 1,4-butanediol.

Examples of ether compound solvents include alkylene glycol alkyl ethers (ethylene glycol monomethyl ether, ethylene glycol monobutyl ether, diethylene glycol, dipropylene glycol, propylene glycol monomethyl ether, diethylene glycol monomethyl ether, triethylene glycol, polyethylene glycol, propylene glycol monomethyl ether, dipropylene glycol monomethyl ether, tripropylene glycol monomethyl ether, diethylene glycol monobutyl ether, and the like), dialkyl ethers (dimethyl ether, diethyl ether, diisopropyl ether, dibutyl ether, and the like), and cyclic ethers (tetrahydrofuran, dioxane (including each of 1,2-, 1,3- and 1,4-isomers)).

Examples of amide compound solvents include N,N-dimethylformamide, N-methyl-2-pyrrolidone, 2-pyrrolidinone, 1,3-dimethyl-2-imidazolidinone, ε-caprolactam, formamide, N-methylformamide, acetamide, N-methylacetamide, N,N-dimethylacetamide, N-methylpropanamide, hexamethylphosphoric triamide, and the like.

Examples of amino compound solvents include triethylamine, diisopropylethylamine, tributylamine, and the like.

Examples of ketone compound solvents include acetone, methyl ethyl ketone, methyl isobutyl ketone, and cyclohexanone.

Examples of aromatic compound solvents include benzene, toluene, xylene, and the like.

Examples of aliphatic compound solvents include hexane, heptane, octane, decane, and the like.

Examples of nitrile compound solvents include acetonitrile, propionitrile, isobutyronitrile, and the like.

Examples of ester compound solvents include ethyl acetate, butyl acetate, propyl acetate, butyl butyrate, butyl pentanoate, and the like.

Examples of non-aqueous dispersion media include the aromatic compound solvents, the aliphatic compound solvents, and the like.

(Auxiliary Conductive Agent)

The solid electrolyte composition of the present invention may also appropriately contain an auxiliary conductive agent that is used to improve the electron conductivity of the active materials as necessary. As the auxiliary conductive agent, ordinary auxiliary conductive agents can be used. The auxiliary conductive agent may be, for example, graphite such as natural graphite or artificial graphite, carbon black such as acetylene black, Ketjen black, or furnace black, irregular carbon such as needle cokes, a carbon fiber such as a vapor-grown carbon fiber or a carbon nanotube, or a carbonaceous material such as graphene or fullerene, all of which are electron-conductive materials, or may be metal powder or a metal fiber of copper, nickel, or the like, and a conductive polymer such as polyaniline, polypyrrole, polythiophene, polyacetylene, or a polyphenylene derivative may also be used. In addition, these auxiliary conductive agents may be used singly or two or more auxiliary conductive agents may be used.

The content of the auxiliary conductive agent in the solid electrolyte composition of the present invention is preferably 0% to 10% by mass.

(Lithium Salt)

The solid electrolyte composition of the present invention preferably contains a lithium salt.

The lithium salt is preferably a lithium salt that is ordinarily used in this kind of products and is not particularly limited. Examples thereof include LiTFSI and the lithium salts described in Paragraphs 0082 to 0085 of JP2015-088486A.

The content of the lithium salt is preferably 0 parts by mass or more and more preferably 5 parts by mass or more with respect to 100 parts by mass of the solid electrolyte. The upper limit is preferably 50 parts by mass or less and more preferably 20 parts by mass or less.

(Dispersant)

The solid electrolyte composition of the present invention may contain a dispersant. In a case in which the dispersant is added to the solid electrolyte composition, it is possible to suppress the agglomeration of the electrode active material or the inorganic solid electrolyte and form a uniform active material layer and a uniform solid electrolyte layer even in a case in which the concentration of any of the electrode active material or the inorganic solid electrolyte is high.

As the dispersant, a dispersant that is ordinarily used in all-solid state secondary batteries can be appropriately selected and used. For example, a dispersant which is made of a low-molecular-weight molecule or an oligomer having a molecular weight of 200 or more and less than 3,000 and contains a functional group represented by a group of functional groups (I) and an alkyl group having 8 or more carbon atoms or an aryl group having 10 or more carbon atoms in the same molecule is preferred.

Group of functional groups (I): an acidic group, a group having a basic nitrogen atom, a (meth)acryl group, a (meth) acrylamide group, an alkoxysilyl group, an epoxy group, an oxetanyl group, an isocyanate group, a cyano group, a mercapto group, and a hydroxy group (an acidic group, a group having a basic nitrogen atom, an alkoxysilyl group, a cyano group, a mercapto group, and a hydroxy group are preferred, and a carboxy group, a sulfonic acid group, a cyano group, an amino group, and a hydroxy group are more preferred).

In a case in which there is a layer including the dispersant in the all-solid state secondary battery of the present invention, the content of the dispersant in the layer is preferably 0.2% to 10% by mass.

(Preparation of Solid Electrolyte Composition)

A method for bringing the particles constituting the first active material and the particles constituting the second active material into contact with each other is not particularly limited. For example, the particles constituting the first active material and the particles constituting the second active material are mixed together at room temperature and fired at 400° C. to 1,200° C. for 0.5 to five hours, whereby it is possible to bring the particles constituting the first active material and the particles constituting the second active material into contact with each other.

The solid electrolyte composition of the present invention can be prepared by mixing or adding an electrode active material (a complex electrode active material) that is constituted by bringing the particles constituting the first active material and the particles constituting the second active material into contact with each other and, as necessary, other components such as the binder particles and the dispersion medium.

[Sheet for all-Solid State Secondary Battery]

In the present invention, a sheet for an all-solid state secondary battery is a sheet that is used for all-solid state secondary batteries and includes a variety of aspects depending on the use. Examples thereof include a sheet that is preferably used in a solid electrolyte layer (also referred to as a solid electrolyte sheet for an all-solid state secondary battery), a sheet that is preferably used in an electrode or a laminate of an electrode and a solid electrolyte layer (an electrode sheet for an all-solid state secondary battery), and the like. In the present invention, there are cases in which a variety of sheets described above will be collectively referred to as the sheet for an all-solid state secondary battery.

The sheet for an all-solid state secondary battery that is used in the present invention is a sheet having a solid electrolyte layer or an active material layer (an electrode layer) on a base material. This sheet for an all-solid state secondary battery may have other layers as long as the sheet has a base material and a solid electrolyte layer or an active material layer, and a sheet having an active material layer is classified as an electrode sheet for an all-solid state secondary battery described below. Examples of other layers include a protective layer, a collector, a coating layer (a collector, another solid electrolyte layer, or another active material layer), and the like.

Examples of the solid electrolyte sheet for an all-solid state secondary battery that is used in the present invention include a sheet having a solid electrolyte layer and a protective layer on a base material in this order.

The base material is not particularly limited as long as the base material is capable of supporting the solid electrolyte layer, and examples thereof include sheet bodies (plate-like bodies) of the materials, the organic materials, the inorganic materials, and the like which have been described in the section of the collector. Examples of the organic materials include a variety of polymers, and specific examples thereof include polyethylene terephthalate, polypropylene, polyethylene, cellulose, and the like. Examples of the inorganic materials include glass, ceramic, and the like.

The constitution and the layer thickness of the solid electrolyte layer in the sheet for an all-solid state secondary battery are the same as the constitution and the layer thickness of the solid electrolyte layer described in the section of the all-solid state secondary battery of the present invention.

This sheet is obtained by forming a film of the solid electrolyte composition for forming the solid electrolyte layer on a base material (possibly, through other layers) (by means of coating and drying) and forming a solid electrolyte layer on the base material.

Here, the solid electrolyte composition of the present invention can be prepared using the above-described method.

The electrode sheet for an all-solid state secondary battery of the present invention (also simply referred to as "the electrode sheet of the present invention") is an electrode sheet having an active material layer on a collector. This electrode sheet is generally a sheet having a collector and an active material layer, but may be an aspect having a collector, an active material layer, and a solid electrolyte layer in this order or an aspect having a collector, an active material layer, a solid electrolyte layer, and an active material layer in this order.

The constitutions and the layer thicknesses of the respective layers constituting the electrode sheet are the same as the constitutions and the layer thicknesses of the respective layers described in the section of the all-solid state secondary battery of the present invention.

The electrode sheet is obtained by forming a film of the solid electrolyte composition of the present invention which contains an active material on a collector (by means of coating and drying) and forming an active material layer on the metal foil.

[Manufacturing of all-Solid State Secondary Battery and Electrode Sheet for all-Solid State Secondary Battery]

The all-solid state secondary battery and the electrode sheet for an all-solid state secondary battery can be manufactured using an ordinary method. Specifically, the all-solid state secondary battery and the electrode sheet for an all-solid state secondary battery can be manufactured by forming the respective layers described above using the solid electrolyte composition of the present invention and the like. The details will be described below.

The all-solid state secondary battery of the present invention can be manufactured using a method including (through) a step of applying the solid electrolyte composition of the present invention onto a metal foil which serves as a collector and forming a coated film (film manufacturing).

For example, a solid electrolyte composition containing an electrode active material for a secondary battery of the present invention is applied as a material for a positive electrode (a composition for a positive electrode layer) onto a metal foil which is a positive electrode collector so as to form a positive electrode active material layer, thereby producing a positive electrode sheet for an all-solid state secondary battery. Next, a solid electrolyte composition for forming a solid electrolyte layer (a composition for a solid electrolyte layer) is applied onto the positive electrode active material layer so as to form a solid electrolyte layer. Furthermore, a solid electrolyte composition containing a negative electrode active material is applied as a material for a negative electrode (a composition for a negative electrode layer) onto the solid electrolyte layer so as to form a negative electrode active material layer. A negative electrode collector (a metal foil) is overlaid on the negative electrode active material layer, whereby it is possible to obtain an all-solid state secondary battery having a structure in which the solid electrolyte layer is sandwiched between the positive electrode active material layer and the negative electrode active material layer. A desired all-solid state secondary battery can be produced by enclosing the all-solid state secondary battery in a chassis as necessary.

In addition, it is also possible to manufacture an all-solid state secondary battery by carrying out the methods for forming the respective layers in a reverse order so as to form a negative electrode active material layer, a solid electrolyte layer and a positive electrode active material layer on a negative electrode collector and overlaying a positive electrode collector thereon.

As another method, the following method can be exemplified. That is, a positive electrode sheet for an all-solid state secondary battery is produced as described above. In addition, a solid electrolyte composition containing a negative electrode active material is applied as a material for a negative electrode (a composition for a negative electrode layer) onto a metal foil which is a negative electrode collector so as to form a negative electrode active material layer, thereby producing a negative electrode sheet for an all-solid state secondary battery. Next, a solid electrolyte layer is formed on the active material layer in any one of these sheets as described above. Furthermore, the other one of the positive electrode sheet for an all-solid state secondary battery and the negative electrode sheet for an all-solid state secondary battery is laminated on the solid electrolyte layer so that the solid electrolyte layer and the active material layer come into contact with each other. An all-solid state secondary battery can be manufactured as described above.

As still another method, the following method can be exemplified. That is, a positive electrode sheet for an all-solid state secondary battery and a negative electrode sheet for an all-solid state secondary battery are produced as described above. In addition, separately from the positive electrode sheet for an all-solid state secondary battery and the negative electrode sheet for an all-solid state secondary battery, a solid electrolyte composition is applied onto a base material, thereby producing a solid electrolyte sheet for an all-solid state secondary battery consisting of a solid electrolyte layer. Furthermore, the positive electrode sheet for an all-solid state secondary battery and the negative electrode sheet for an all-solid state secondary battery are laminated together so as to sandwich the solid electrolyte layer that has been peeled off from the base material. An all-solid state secondary battery can be manufactured as described above.

An all-solid state secondary battery can be manufactured by combining the above-described forming methods. For example, a positive electrode sheet for an all-solid state secondary battery, a negative electrode sheet for an all-solid state secondary battery, and a solid electrolyte sheet for an all-solid state secondary battery are produced respectively. Next, a solid electrolyte layer peeled off from a base material is laminated on the negative electrode sheet for an all-solid state secondary battery and is then attached to the positive electrode sheet for an all-solid state secondary battery, whereby an all-solid state secondary battery can be manufactured. In this method, it is also possible to laminate the solid electrolyte layer on the positive electrode sheet for an all-solid state secondary battery and attach the solid electrolyte layer to the negative electrode sheet for an all-solid state secondary battery.

(Formation of Individual Layers (Film Formation))

The method for applying the solid electrolyte composition is not particularly limited and can be appropriately selected. Examples thereof include coating (preferably wet-type coating), spray coating, spin coating, dip coating, slit coating, stripe coating, and bar coating.

At this time, the solid electrolyte composition may be dried after being applied or may be dried after being applied to multiple layers. The drying temperature is not particularly limited. The lower limit is preferably 30° C. or higher, more preferably 60° C. or higher, and still more preferably 80° C. or higher, and the upper limit is preferably 300° C. or lower, more preferably 250° C. or lower, and still more preferably 200° C. or lower. In a case in which the compositions are heated in the above-described temperature range, it is possible to remove the dispersion medium and form a solid state. In addition, the temperature is not excessively increased, and the respective members of the all-solid state secondary battery are not impaired, which is preferable. Therefore, in the all-solid state secondary battery, excellent total performance is exhibited, and it is possible to obtain a favorable bonding property and a favorable ion conductivity even without pressurization.

After the production of the applied solid electrolyte composition or the all-solid state secondary battery, the respective layers or the all-solid state secondary battery is preferably pressurized. In addition, the respective layers are also preferably pressurized in a state of being laminated together. Examples of the pressurization method include a hydraulic cylinder pressing machine and the like. The welding pressure is not particularly limited, but is, generally, preferably in a range of 50 to 1,500 MPa.

In addition, the applied solid electrolyte composition may be heated at the same time as pressurization. The heating temperature is not particularly limited, but is generally in a range of 30° C. to 300° C. The respective layers or the all-solid state secondary battery can also be pressed at a temperature higher than the glass transition temperature of the inorganic solid electrolyte. Meanwhile, in a case in which the inorganic solid electrolyte and the binder particles coexist, the respective layers or the all-solid state secondary battery can also be pressed at a temperature higher than the glass transition temperature of the polymer forming the binder particles. However, generally, the pressing temperature is a temperature that does not exceed the melting point of the polymer.

The pressurization may be carried out in a state in which the applied solvent or dispersion medium has been dried in advance or in a state in which the solvent or the dispersion medium remains.

The atmosphere during the pressurization is not particularly limited and may be any one of in the atmosphere, under the dried air (the dew point: −20° C. or lower), in an inert gas (for example, in an argon gas, in a helium gas, or in a nitrogen gas), and the like.

The pressing time may be a short time (for example, within several hours) at a high pressure or a long time (one day or longer) under the application of an intermediate pressure. In the case of members other than the sheet for an all-solid state secondary battery, for example, the all-solid state secondary battery, it is also possible to use a restraining device (screw fastening pressure or the like) of the all-solid state secondary battery in order to continuously apply an intermediate pressure.

The pressing pressure may be a pressure that is constant or varies with respect to a portion under pressure such as a sheet surface.

The pressing pressure can be changed depending on the area or film thickness of the portion under pressure. In addition, it is also possible to apply different pressures to the same portion.

A pressing surface may be flat or roughened.

(Initialization)

The all-solid state secondary battery manufactured as described above is preferably initialized after the manufacturing or before the use. The initialization is not particularly limited, and it is possible to initialize the all-solid state secondary battery by, for example, carrying out initial charging and discharging in a state in which the pressing pressure is increased and then releasing the pressure up to a pressure at which the all-solid state secondary battery is ordinarily used.

[Uses of all-Solid State Secondary Battery]

The all-solid state secondary battery of the present invention can be applied to a variety of uses. Application aspects are not particularly limited, and, in the case of being mounted in electronic devices, examples thereof include notebook computers, pen-based input personal computers, mobile personal computers, e-book players, mobile phones, cordless phone handsets, pagers, handy terminals, portable faxes, mobile copiers, portable printers, headphone stereos, video movies, liquid crystal televisions, handy cleaners, portable CDs, mini discs, electric shavers, transceivers, electronic notebooks, calculators, portable tape recorders, radios, backup power supplies, memory cards, and the like. Additionally, examples of consumer uses include automobiles, electric vehicles, motors, lighting equipment, toys, game devices, road conditioners, watches, strobes, cameras, medical devices (pacemakers, hearing aids, shoulder massage devices, and the like), and the like. Furthermore, the all-solid state secondary battery can be used for a variety of military uses and universe uses. In addition, the all-solid state secondary battery can also be combined with solar batteries.

Among these, the all-solid state secondary battery is preferably applied to applications for which a high capacity and high-rate discharging characteristics are required. For example, in electricity storage facilities in which an increase in the capacity is expected in the future, it is necessary to satisfy both high safety, which is essential, and furthermore, the battery performance. In addition, in electric vehicles mounting high-capacity secondary batteries and domestic uses in which batteries are charged out every day, better safety is required against overcharging. According to the present invention, it is possible to preferably cope with the above-described use aspects and exhibit excellent effects.

All-solid state secondary batteries refer to secondary batteries having a positive electrode, a negative electrode, and an electrolyte which are all constituted of solid. In other words, all-solid state secondary batteries are differentiated from electrolytic solution-type secondary batteries in which a carbonate-based solvent is used as an electrolyte. Among these, the present invention is assumed to be an inorganic all-solid state secondary battery. All-solid state secondary batteries are classified into organic (polymer) all-solid state secondary batteries in which a polymer compound such as polyethylene oxide is used as an electrolyte and inorganic all-solid state secondary batteries in which the Li—P—S-based glass, LLT, LLZ, and the like is used. Meanwhile, the application of polymer compounds to inorganic all-solid state secondary batteries is not inhibited, and polymer compounds can also be applied as binder particles of positive electrode active materials, negative electrode active materials, and inorganic solid electrolyte particles.

Inorganic solid electrolytes are differentiated from electrolytes in which the above-described polymer compound such as polyethylene oxide is used as an ion conductive medium (polymer electrolyte), and inorganic compounds serve as ion conductive media. Specific examples thereof include the Li—P—S-based glass. LLT, and LLZ. Inorganic solid electrolytes do not emit positive ions (Li ions) and exhibit an ion transportation function. In contrast, there are cases in which materials serving as an ion supply source which is added to electrolytic solutions or solid electrolyte layers and emits positive ions (Li ions) are referred to as electrolytes, however, in the case of being differentiated from electrolytes as the ion transportation materials, the materials are referred to as "electrolyte salts" or "supporting electrolytes". Examples of the electrolyte salts include lithium bistrifluoromethanesulfonylimide (LiTFSI).

In the case of being referred to as a "composition" in the present invention, the "composition" refers to a mixture obtained by uniformly mixing two or more components. Here, the composition needs to substantially maintain uniformity and may partially include agglomeration or uneven distribution as long as the compositions exhibit desired effects. In addition, particularly, in the case of being referred to as a solid electrolyte composition, the solid electrolyte composition basically refers to a composition (typically having a paste form) which serves as a material for forming the solid electrolyte layer or the like, and an electrolyte layer or the like formed by curing the above-described composition is not considered as the solid electrolyte composition.

EXAMPLES

Hereinafter, the present invention will be described in more detail on the basis of examples. Meanwhile, the present invention is not interpreted to be limited thereto. In the following examples, "parts" and "%" are mass-based unless particularly otherwise described. In addition, the symbol "-" that is used in tables represents the fact that the corresponding component is not contained in the composition of the corresponding example. In addition, room temperature refers to 25° C.

Synthesis Example

Synthesis of Sulfide-Based Inorganic Solid Electrolytes (Li—P—S-Based Glass)

As sulfide-based inorganic solid electrolytes. Li—P—S-based glass was synthesized with reference to T. Ohtomo, A. Hayashi, M. Tatsumisago, Y. Tsuchida, S. Hama, K. Kawamoto, Journal of Power Sources, 233, (2013), pp 231 to 235, A. Hayashi, S. Hama, H. Morimoto, M. Tatsumisago, T. Minami, Chem. Lett., (2001), pp 872 to 873.

Specifically, in a glove box under an argon atmosphere (dew point: −70° C.), lithium sulfide ($Li_2S$, manufactured by Sigma-Aldrich Purity: >99.98%) (2.42 g) and diphosphorus pentasulfide ($P_2S_5$, manufactured by Sigma-Aldrich Purity: >99%) (3.90 g) were weighed respectively, injected into an agate mortar, and mixed together at room temperature using an agate muddler for five minutes. Meanwhile, the molar ratio between $Li_2S$ and $P_2S_5$ was set to 75:25 ($Li_2S$:$P_2S_5$).

Sixty six zirconia beads having a diameter of 5 mm were injected into a 45 mL zirconia container (manufactured by Fritsch Japan Co., Ltd.), then, the full amount of a mixture of the lithium sulfide and the diphosphorus pentasulfide was injected thereinto, and the container was sealed under the argon atmosphere. The container was set in a planetary ball mill P-7 (trade name) manufactured by Fritsch Japan Co., Ltd., mechanical milling was carried out at a temperature of 25° C. and a rotation speed of 510 rpm for 20 hours, thereby obtaining yellow powder of a sulfide-based inorganic solid electrolyte (Li—P—S-based glass) (6.20 g).

Preparation of Active Materials

Preparation Example 1

$Li_2CO_3$ and $Co_3O_4$ were injected into an agate mortar so that the molar ratio of Li:Co reached 1.05:1 and mixed together using an agate muddler at room temperature for 20 minutes. The obtained powder was fired in the atmosphere at 800° C. for 10 hours, thereby obtaining $LiCoO_2$ having a bedded salt structure. Similarly, $Li_2CO_3$, NiO, $Co_3O_4$, and $Al_2O_3$ were injected into an agate mortar so that the molar ratio of Li:Ni:Co:Al reached 1.05:0.8:0.15:0.05 and mixed together using an agate muddler at room temperature for 10 minutes. The obtained powder was fired in the atmosphere at 900° C. for 10 hours, thereby obtaining $LiNi_{0.8}Co_{0.15}Al_{0.05}O_2$ having a bedded salt structure. The obtained $LiCoO_2$ and $LiNi_{0.8}Co_{0.15}Al_{0.05}O_2$ were mixed together in a mass ratio of 1:1 and fired in the atmosphere at 900° C. for 30 minutes, thereby obtaining a complex positive electrode active material of $LiCoO_2$ and $LiNi_{0.8}Co_{0.15}Al_{0.05}O_2$ having a bedded salt structure. As a result of carrying out observation and an element analysis on the obtained active material using a scanning electron microscope (SEM) and an energy dispersive X-ray (EDX), it was confirmed that $LiCoO_2$ and $LiNi_{0.8}Co_{0.15}Al_{0.05}O_2$ had the same degree of primary particle diameter, the primary particles of $LiCoO_2$ and the primary particles of $LiNi_{0.8}Co_{0.15}Al_{0.05}O_2$ agglomerated, and secondary particles were formed.

Preparation Example 2

$Li_2CO_3$ and $Co_3O_4$ were injected into an agate mortar so that the molar ratio of Li:Co reached 1.05:1 and mixed together using an agate muddler at room temperature for 20 minutes. The obtained powder was fired in the atmosphere at 800° C. for 10 hours, thereby obtaining $LiCoO_2$ having a bedded salt structure. Similarly, $Li_2CO_3$, NiO, $Co_3O_4$, and $Al_2O_3$ were injected into an agate mortar so that the molar ratio of Li:Ni:Co:Al reached 1.05:0.8:0.15:0.05 and mixed together using an agate muddler at room temperature for 10 minutes. The obtained powder was tired in the atmosphere at 900° C. for 10 hours, thereby obtaining $LiNi_{0.8}Co_{0.15}Al_{0.05}O_2$ having a bedded salt structure. Powder of the obtained $LiNi_{0.8}Co_{0.15}Al_{0.05}O_2$, 66 zirconia beads having a diameter of 5 mm, and acetone were injected into a 45 mL zirconia container (manufactured by Fritsch Japan Co., Ltd.), and the container was sealed. The container was set in a planetary ball mill P-7 (trade name) manufactured by Fritsch Japan Co., Ltd., and mechanical milling was carried out at a temperature of 25° C. and a rotation speed of 400 rpm for one hour. The above-obtained $LiCoO_2$ and $LiNi_{0.8}Co_{0.15}Al_{0.05}O_2$ were mixed together in a mass ratio of 1:1 and fired in the atmosphere at 900° C. for one hour, thereby obtaining a complex positive electrode active material of $LiCoO_2$ and $LiNi_{0.8}Co_{0.15}Al_{0.05}O_2$ having a bedded salt structure. As a result of carrying out observation and an element analysis on the obtained active material using an SEM and an EDX, it was confirmed that the primary particles of $LiCoO_2$ were coated with $LiNi_{0.8}Co_{0.15}Al_{0.05}O_2$ having a relatively smaller primary particle diameter than $LiCoO_2$, and secondary particles were formed.

Preparation Example 3

$Li_2CO_3$, NiO, and $Mn_2O_3$ were injected into an agate mortar so that the molar ratio of Li:Ni:Mn reached 1.05:0.5:1.5 and mixed together using an agate muddler at room temperature for 20 minutes. The obtained powder was fired in the atmosphere at 800° C. for 10 hours, thereby preparing $LiNi_{0.5}Mn_{1.5}O_4$ having a spinel structure. The obtained $LiNi_{0.5}Mn_{1.5}O_4$ was dispersed in pure water, $LiOH{\cdot}H_2O$ and CoOOH were added so that Li:Co reached 1:1, and a hydrothermal treatment was carried out at 150° C. for 20 hours using an autoclave. The obtained powder was fired in the atmosphere at 900° C. for 30 minutes, thereby obtaining a complex positive electrode active material of $LiCoO_2$ having a bedded salt structure and $LiNi_{0.5}Mn_{1.5}O_4$ having a spinel structure. In the hydrothermal treatment, $LiOH{\cdot}H_2O$ and CoOOH were added so that the mass ratio between $LiCoO_2$ and $LiNi_{0.5}Mn_{1.5}O_4$ reached 1:1. As a result of carrying out observation and an element analysis on the obtained active material using an SEM and an EDX, it was confirmed that the primary particles of $LiNi_{0.5}Mn_{1.5}O_4$ were coated with $LiCoO_2$ having a relatively smaller primary particle diameter than $LiNi_{0.5}Mn_{1.5}O_4$, and secondary particles were formed.

Preparation Example 4

$Li_2CO_3$ and $Co_3O_4$ were injected into an agate mortar so that the molar ratio of Li:Co reached 1.05:1 and mixed together using an agate muddler at room temperature for 20 minutes. The obtained powder was fired in the atmosphere at 800° C. for 10 hours, thereby preparing $LiCoO_2$ having a bedded salt structure. Similarly, $Li_2CO_3$, NiO, $Co_3O_4$, and $Al_2O_3$ were injected into an agate mortar so that the molar ratio of Li:Ni:Co:Al reached 1.05:0.8:0.15:0.05 and mixed together using an agate muddler at room temperature for 10 minutes. The obtained powder was fired in the atmosphere at 900° C. for 10 hours, thereby preparing $LiNi_{0.8}Co_{0.15}Al_{0.05}O_2$ having a bedded salt structure. The obtained $LiCoO_2$ and $LiNi_{0.8}Co_{0.15}Al_{0.05}O_2$ were injected into an agate mortar and mixed together using an agate muddler at room temperature for 10 minutes, thereby obtaining a positive electrode active material. As a result of carrying out observation and an element analysis on the obtained active material using an SEM and an EDX, it was confirmed that $LiCoO_2$ and $LiNi_{0.8}Co_{0.15}Al_{0.05}O_2$ had the same degree of primary particle diameter, the primary particles of $LiCoO_2$ and the primary particles of $LiNi_{0.8}Co_{0.15}Al_{0.05}O_2$ agglomerated, and secondary particles were formed.

Preparation Example 5

$Li_2CO_3$ and $Co_3O_4$ were injected into an agate mortar so that the molar ratio of Li:Co reached 1.05:1 and mixed together using an agate muddler at room temperature for 20 minutes. The obtained powder was fired in the atmosphere at 800° C. for 10 hours, thereby preparing $LiCoO_2$ having a bedded salt structure. Similarly, $Li_2CO_3$, NiO, and $Mn_2O_3$ were injected into an agate mortar so that the molar ratio of Li:Ni:Mn reached 1.05:0.5:1.5 and mixed together using an agate muddler at room temperature for 10 minutes. The obtained powder was fired in the atmosphere at 800° C. for 10 hours, thereby preparing $LiNi_{0.5}Mn_{1.5}O_4$ having a spinel structure. The obtained $LiCoO_2$ and $LiNi_{0.5}Mn_{1.5}O_4$ were mixed together in a mass ratio of 1:1 and fired in the atmosphere at 900° C. for 30 minutes, thereby obtaining a complex positive electrode active material. As a result of carrying out observation and an element analysis on the obtained active material using an SEM and an EDX, it was confirmed that $LiCoO_2$ and $LiNi_{0.5}Mn_{1.5}O_4$ had the same degree of primary particle diameter, the primary particles of $LiCoO_2$ and the primary particles of $LiNi_{0.5}Mn_{1.5}O_4$ agglomerated, and secondary particles were formed.

Preparation Example 6

$Li_2CO_3$ and $Co_3O_4$ were injected into an agate mortar so that the molar ratio of Li:Co reached 1.05:1 and mixed together using an agate muddler at room temperature for 20 minutes. The obtained powder was fired in the atmosphere at 800° C. for 10 hours, thereby obtaining $LiCoO_2$ having a bedded salt structure.

Preparation Example 7

$Li_2CO_3$, NiO, $Co_3O_4$, and $Al_2O_3$ were injected into an agate mortar so that the molar ratio of Li:Ni:Co:Al reached 1.05:0.8:0.15:0.05 and mixed together using an agate muddler at room temperature for 10 minutes. The obtained powder was fired in the atmosphere at 900° C. for 10 hours, thereby obtaining $LiNi_{0.8}Co_{0.15}Al_{0.05}O_2$ having a bedded salt structure.

Preparation Example 8

$Li_2CO_3$, NiO, and $Mn_2O_3$ were injected into an agate mortar so that the molar ratio of Li:Ni:Mn reached 1.05:0.5:1.5 and mixed together using an agate muddler at room temperature for 10 minutes. The obtained powder was tired in the atmosphere at 800° C. for 10 hours, thereby obtaining $LiNi_{0.5}Mn_{1.5}O_4$ having a spinel structure.

Example 1

Preparation of Composition for Negative Electrode

One hundred eighty zirconia beads having a diameter of 5 mm were injected into a 45 mL zirconia container (manufactured by Fritsch Japan Co., Ltd.), and Li—P—S-based glass synthesized above (1.8 g), trade name FLO-BEADS LE-1080 manufactured by Sumitomo Seika Chemicals Co., Ltd. (a binder having a particle shape) (0.2 g) as a binder, and isobutyronitrile (12.3 g) as a dispersion medium were injected thereinto. The container was set in a planetary ball mill P-7 manufactured by Fritsch Japan Co., Ltd., the components were continuously mixed at a temperature of 25° C. and a rotation speed of 300 rpm for two hours, then, graphite (average particle diameter: 20 μm, manufactured by Nippon Kokuen Group) (8.0 g) was injected as an active material into the container, similarly, the container was set in the planetary ball mill P-7, and the components were continuously mixed together at a temperature of 25° C. and a rotation speed of 100 rpm for 10 minutes, thereby preparing a composition for a negative electrode layer.

Preparation of Composition for Solid Electrolyte Layer

One hundred eighty zirconia beads having a diameter of 5 mm were injected into a 45 mL zirconia container (manufactured by Fritsch Japan Co., Ltd.), and Li—P—S-based glass synthesized above (9.8 g), trade name FLO-BEADS LE-1080 manufactured by Sumitomo Seika Chemicals Co., Ltd. (0.2 g) as a binder, and isobutyronitrile (15.0 g) as a dispersion medium were injected thereinto. After that, the container was set in a planetary ball mill P-7, the components were continuously stirred at a temperature of 25° C. and a rotation speed of 300 rpm for two hours, thereby preparing a composition for a solid electrolyte layer.

<Preparation of Composition for Positive Electrode Layer>

One hundred eighty zirconia beads having a diameter of 5 mm were injected into a 45 mL zirconia container (manufactured by Fritsch Japan Co., Ltd.), and Li—P—S-based glass synthesized above (2.45 g), trade name FLO-BEADS LE-1080 manufactured by Sumitomo Seika Chemicals Co., Ltd. (0.2 g) as a binder, and isobutyronitrile (12.3 g) as a dispersion medium were injected thereinto. The container was set in a planetary ball mill P-7 manufactured by Fritsch Japan Co., Ltd., and the components were continuously mixed at a temperature of 25° C. and a rotation speed of 300 rpm for two hours. After that, the complex positive electrode active material obtained in Preparation Example 1 (9.8 g) was injected into the container as an active material, similarly, the container was set in the planetary ball mill P-7, and the components were continuously mixed together at a temperature of 25° C. and a rotation speed of 200 rpm for 15 minutes, thereby preparing a composition for a positive electrode layer.

—Production of Negative Electrode Sheet for all-Solid State Secondary Battery—

The composition for a negative electrode layer prepared above was applied onto a 20 μm-thick copper foil using an applicator (trade name: SA-201 Baker-type applicator, manufactured by Tester Sangyo Co., Ltd.), heated at 80° C. for one hour, and, furthermore, dried at 110° C. for one hour. After that, the dried composition was heated (at 120° C.) and pressurized (at a pressure of 600 MPa for one minute) using a heat pressing machine, thereby producing a negative electrode sheet for an all-solid state secondary battery having a laminate structure of the negative electrode active material layer and the copper foil.

The composition for a solid electrolyte layer prepared above was applied onto the negative electrode active material layer produced above using an applicator, heated at 80° C. for one hour, and, furthermore, heated at 110° C. for six hours. A sheet having a solid electrolyte layer formed on the negative electrode active material layer was heated (at 120° C.) and pressurized (at a pressure of 600 MPa for one minute) using a heat pressing machine, thereby producing a negative electrode sheet for an all-solid state secondary battery having a laminate structure of the solid electrolyte layer, the negative electrode active material layer, and the copper foil.

—Production of Positive Electrode Sheet for all-Solid State Secondary Battery—

The composition for a positive electrode layer prepared above was applied onto a 20 rpm-thick aluminum foil using an applicator, heated at 80° C. for one hour, and, furthermore, dried at 110° C. for one hour. After that, the composition was heated (at 120° C.) and pressurized (at a pressure of 600 MPa for one minute) using a heat pressing machine, thereby producing a positive electrode sheet for an all-solid state secondary battery having a laminate structure of the positive electrode active material layer and the aluminum foil.

—Manufacturing of Coin Battery—

Figure 2:
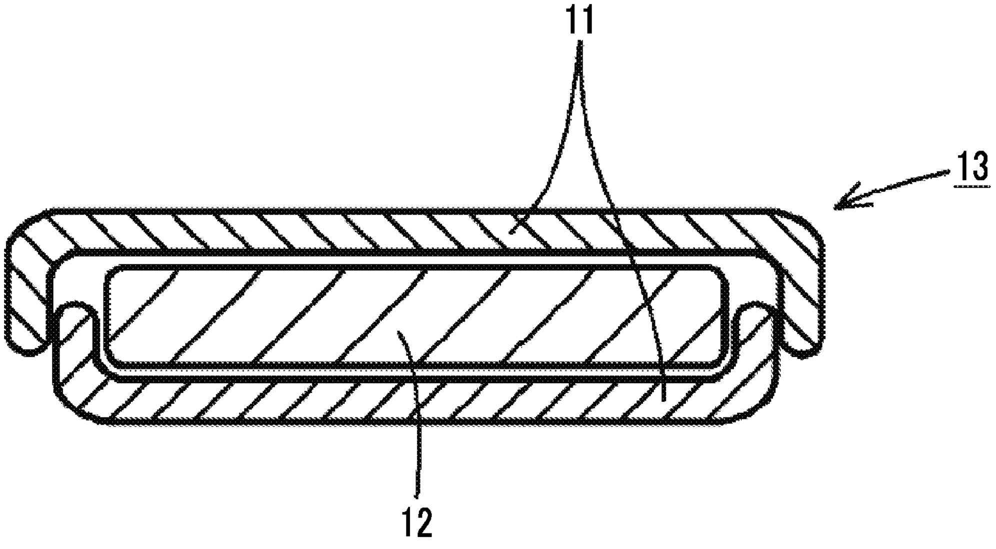
FIG. 2 is a vertical cross-sectional view schematically illustrating an all-solid state secondary battery (coin battery) produced in an example.

A disc-shaped piece having a diameter of 14.5 mm was cut out from the negative electrode sheet for an all-solid state secondary battery manufactured above and put into a 2032-type stainless steel coin case 11 into which a spacer and a washer (not illustrated) were combined so that disc-shaped pieces having a diameter of 13.0 mm cut out from the positive electrode active material layer and the solid electrolyte layer in the positive electrode sheet for an all-solid state secondary battery faced each other. A coin battery 13 of Example 1 shown in Table 1 which had a constitution of FIG. 2 was manufactured in the above-described manner.

An all-solid state secondary battery sheet in a 2032-type coin case has the constitution of FIG. 1 and has a laminate structure of a negative electrode sheet for an all-solid state secondary battery (a copper foil/a negative electrode active material layer)/a solid electrolyte layer/a positive electrode sheet for an all-solid state secondary battery (a positive electrode active material layer/an aluminum foil). The layer thicknesses of the positive electrode active material layer, the negative electrode active material layer, and the solid electrolyte layer were 45 μm, 30 μm, and 40 μm respectively in this order.

Examples 2 to 6 and Comparative Examples 1 to 5

All-solid state secondary batteries of Examples 2 to 6 and Comparative Examples 1 to 5 were manufactured respectively in the same manner as the all-solid state secondary battery of Example 1 except for the fact that the positive electrode active material and the binder were adjusted so as to produce a composition shown in Table 1. Meanwhile, to the composition for a positive electrode layer which was used to produce the all-solid state secondary batteries of Examples 2 to 6 and Comparative Examples 1 to 5, similar to Example 1, in a case in which the content of the active material is set to 80% by mass, the Li—P—S-based glass synthesized above was added so that the content thereof reached 20% by mass.

The cycle characteristics of the all-solid state secondary batteries of Examples 1 to 6 and Comparative Examples 1 to 5 manufactured above were evaluated. The results are shown in Table 1.

<Evaluation of Cycle Characteristics (Discharge Capacity Retention)>

The all-solid state secondary batteries manufactured above were measured using a charge and discharge evaluation device TOSCAT-3000 (trade name) manufactured by Toyo System Corporation.

The batteries were charged at a current value of 0.2 mA until the battery voltage reached 4.2 V and then discharged at a current value of 0.2 mA until the battery voltage reached 3.0 V, which was considered as one cycle. The discharge capacity retention (%) was obtained from the following expression.

Discharge capacity at $100^{th}$ cycle[mAh]/discharge capacity at first cycle[mAh]×100

<Observation Method and Measurement Method>

In Table 1, the expression "including crystal portion" means that "the interface in which the particles constituting the first active material and the particles constituting the second active material are in contact with each other forms a solid solution to form a crystal portion". Whether or not the crystal portion was included was determined by means of observation using a transmission electron microscope (TEM).

The determination criteria and the observation conditions will be described below.

—Determination Criteria—

Including crystal portion: Lattice fringes were observed in the contact places between the particles constituting the first active material and the particles constituting the second active material.

Not including crystal portion: Lattice fringes were not observed in the contact places between the particles constituting the first active material and the particles constituting the second active material.

—Observation Conditions—

The acceleration voltage was set to 300 kV, and the contact interface between the first active material and the second active material was observed at a magnification of two million times.

The volume average particle diameters in Table 1 were measured using the above-described method.

In addition, a method for measuring Particle Diameter 3 (average secondary particle diameter) in Table 1 will be described below.

The secondary particles of the active material were observed using a scanning electron microscope (SEM), ten secondary particles were randomly selected from the secondary particles of the active material, the horizontal Feret's diameters and the vertical Feret's diameters of the respective secondary particles were measured, and the total of the measurement values of the larger Feret's diameters was divided by ten, thereby computing the average value.

TABLE 1

| | First positive electrode active material | | | Second positive electrode active material | | | Binder | | | | | |
|---|---|---|---|---|---|---|---|---|---|---|---|---|
| | Kind | % by mass | Particle Diameter 1 (μm) | Kind | % by mass | Particle Diameter 2 (μm) | Kind | % by mass | Particle Diameter 3 (μm) | Presence and absence of crystal portion | Discharge capacity retention | Note |
| Example 1 | $LiCoO_2$ | 49 | 2.1 | $LiNi_{0.8}Co_{0.15}Al_{0.05}O_2$ | 49 | 1.7 | LE-1080 | 2 | 7.5 | Included | 93.1% | Preparation Example 1 |
| Example 2 | $LiCoO_2$ | 49 | 2.1 | $LiNi_{0.8}Co_{0.15}Al_{0.05}O_2$ | 49 | 0.4 | LE-1080 | 2 | 3.8 | Included | 96.3% | Preparation Example 2 |
| Example 3 | $LiCoO_2$ | 49 | 0.4 | $LiNi_{0.5}Mn_{1.5}O_4$ | 49 | 1.8 | LE-1080 | 2 | 4.1 | Included | 91.4% | Preparation Example 3 |
| Example 4 | $LiCoO_2$ | 50 | 2.1 | $LiNi_{0.8}Co_{0.15}Al_{0.05}O_2$ | 50 | 1.7 | — | — | 7.2 | Included | 90.2% | Preparation Example 1 |
| Example 5 | $LiCoO_2$ | 49 | 2.1 | $LiNi_{0.8}Co_{0.15}Al_{0.05}O_2$ | 49 | 0.4 | Acryl-based | 2 | 3.8 | Included | 97.7% | Preparation Example 2 |
| Example 6 | $LiCoO_2$ | 49 | 2.1 | $LiNi_{0.8}Co_{0.15}Al_{0.05}O_2$ | 49 | 0.4 | Urethane-based | 2 | 3.8 | Included | 97.8% | Preparation Example 2 |
| Comparative Example 1 | $LiCoO_2$ | 49 | 2.1 | $LiNi_{0.8}Co_{0.15}Al_{0.05}O_2$ | 49 | 1.7 | LE-1080 | 2 | 2.4 | Not included | 84.6% | Preparation Example 4 |
| Comparative Example 2 | $LiCoO_2$ | 49 | 2.1 | $LiNi_{0.5}Mn_{1.5}O_4$ | 49 | 1.8 | LE-1080 | 2 | 8.4 | Not included | 82.7% | Preparation Example 5 |
| Comparative Example 3 | $LiCoO_2$ | 98 | 2.1 | — | — | — | LE-1080 | 2 | 2.3 | — | 76.0% | Preparation Example 6 |
| Comparative Example 4 | — | — | — | $LiNi_{0.8}Co_{0.15}Al_{0.05}O_2$ | 98 | 1.7 | LE-1080 | 2 | 2.1 | — | 77.2% | Preparation Example 7 |

TABLE 1-continued

| | First positive electrode active material | | | Second positive electrode active material | | | Binder | | | Presence and absence of crystal portion | Discharge capacity retention | Note |
|---|---|---|---|---|---|---|---|---|---|---|---|---|
| | Kind | % by mass | Particle Diameter 1 (μm) | Kind | % by mass | Particle Diameter 2 (μm) | Kind | % by mass | Particle Diameter 3 (μm) | | | |
| Comparative Example 5 | — | — | — | $LiNi_{0.5}Mn_{1.5}O_4$ | 98 | 1.8 | LE-1080 | 2 | 2.4 | — | 75.0% | Preparation Example 8 |

<Note of Table>
Particle Diameters 1 and 2: Volume average particle diameter
Particle Diameter 3: Average secondary particle diameter
Note:
Preparation Example Nos. in which the positive electrode active materials used in the respective examples and the respective comparative examples were prepared are shown.
Acryl-based: B-1 described in [0.127] of JP2015-88480A
Urethane-based: Exemplary Compound (1) described in [0.188] of JP2015-88480A.

As is clear from Table 1, it is found that the all-solid state secondary batteries of Examples 1 to 6 including the electrode layer including the first active material that expanded during charging and contracted during discharging and a second active material that, in an opposite manner to the first active material, contracted during charging and expanded during discharging all had excellent cycle characteristics. Meanwhile, in the all-solid state secondary battery of Example 2, the secondary particles were formed by coating the primary particles of $LiCoO_2$ which was the first active material with $LiNi_{0.8}Co_{0.15}Al_{0.05}O_2$ which was the second active material having a relatively smaller primary particle diameters than $LiCoO_2$, and thus the contact area between the first and second active materials increased, the volume changes of the active materials were more efficiently offset, and the cycle characteristics were superior to those of the all-solid state secondary battery of Example 1.

The present invention has been described together with the embodiment; however, unless particularly designated, the present inventors do not intend to limit the present invention to any detailed portion of the description and consider that the present invention is supposed to be broadly interpreted within the concept and scope of the present invention described in the claims.

EXPLANATION OF REFERENCES

1: negative electrode collector
2: negative electrode active material layer
3: solid electrolyte layer
4: positive electrode active material layer
5: positive electrode collector
6: operation portion
10: all-solid state secondary battery
11: 2032-type coin case
12: all-solid state secondary battery sheet
13: cell for measuring cycle characteristics (coin battery)

What is claimed is:

1. An electrode active material mixture for an all-solid state secondary battery comprising:

a mixture of a first electrode active material and a second electrode active material, wherein the first electrode active material expands during charging and contracts during discharging, the second electrode active material contracts during charging and expands during discharging, some of particles constituting the first electrode active material and some of particles constituting the second electrode active material are in contact with each other, and an interface in which the particles constituting the first electrode active material and the particles constituting the second electrode active material are in contact with each other forms a solid solution to form a crystal portion.

2. The electrode active material mixture for an all-solid state secondary battery according to claim 1, wherein the first electrode active material is a lithium cobalt-based oxide, and the second electrode active material is a lithium nickel-based oxide.

3. The electrode active material mixture for an all-solid state secondary battery according to claim 2, wherein the first electrode active material and the second electrode active material include a crystal phase having a bedded salt-type structure.

4. The electrode active material mixture for an all-solid state secondary battery according to claim 1, wherein the particles constituting the first electrode active material are coated with the particles constituting the second electrode active material.

5. The electrode active material mixture for an all-solid state secondary battery according to claim 1, wherein the particles constituting the second electrode active material are coated with the particles constituting the first electrode active material.

6. The electrode active material mixture for an all-solid state secondary battery according to claim 1, in which the mass ratio between the content of the first electrode active material and the content of the second electrode active material is 60:40 to 40:60.

7. A solid electrolyte composition comprising:

the electrode active material mixture for an all-solid state secondary battery according to claim 1; and an inorganic solid electrolyte.

8. The solid electrolyte composition according to claim 7, further comprising:

a binder.

9. The solid electrolyte composition according to claim 8, wherein the binder has a particle shape.

10. The solid electrolyte composition according to claim 8, wherein the binder is an acrylic latex, an urethane latex, or an urea latex.

11. The solid electrolyte composition according to claim 8, wherein the binder is a polymer having a partial structure represented by Formula (I), Formula (I)

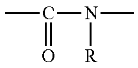

in Formula (I), R represents a hydrogen atom or a monovalent organic group.

12. An electrode sheet for an all-solid state secondary battery comprising:

a layer of the solid electrolyte composition according to claim 7 on a collector.

13. An all-solid state secondary battery comprising:

a positive electrode active material layer;

a negative electrode active material layer; and an inorganic solid electrolyte layer, wherein at least one layer of the positive electrode active material layer or the negative electrode active material layer is a layer of the solid electrolyte composition according to claim 7.

14. A method for manufacturing the electrode active material mixture for an all-solid state secondary battery according to claim 1, the method comprising:

a step of forming a solid solution in a contact interface of the particles constituting the first electrode active material and the particles constituting the second electrode active material, wherein the first electrode active material expands during charging and contracts during discharging, the second electrode active material contracts during charging and expands during discharging, some of the particles constituting the first electrode active material and some of the particles constituting the second electrode active material are in contact with each other, and an interface in which the particles constituting the first electrode active material and the particles constituting the second electrode active material are in contact with each other forms a solid solution to form a crystal portion.

15. The method for manufacturing the electrode active material for an all-solid state secondary battery according to claim 14, in which the mass ratio between the content of the first electrode active material and the content of the second electrode active material is 60:40 to 40:60 in the electrode active material.

* * * * *